(12) United States Patent
Fukumoto et al.

(10) Patent No.: US 11,780,398 B2
(45) Date of Patent: Oct. 10, 2023

(54) COUPLING STRUCTURE, AIRBAG DEVICE, AND VEHICLE SEAT

(71) Applicant: DAICEL CORPORATION, Osaka (JP)

(72) Inventors: Kenji Fukumoto, Tokyo (JP); Tomoki Hashizume, Tokyo (JP); Masayuki Yamazaki, Tokyo (JP)

(73) Assignee: DAICEL CORPORATION, Osaka (JP)

(*) Notice: Subject to any disclaimer, the term of this patent is extended or adjusted under 35 U.S.C. 154(b) by 0 days.

(21) Appl. No.: 17/801,187

(22) PCT Filed: Jan. 26, 2021

(86) PCT No.: PCT/JP2021/002559
§ 371 (c)(1),
(2) Date: Aug. 19, 2022

(87) PCT Pub. No.: WO2021/166564
PCT Pub. Date: Aug. 26, 2021

(65) Prior Publication Data
US 2023/0099992 A1 Mar. 30, 2023

(30) Foreign Application Priority Data
Feb. 21, 2020 (JP) .................... 2020-028670

(51) Int. Cl.
*B60R 21/207* (2006.01)
*B60N 2/22* (2006.01)
*B60N 2/42* (2006.01)

(52) U.S. Cl.
CPC ............ *B60R 21/207* (2013.01); *B60N 2/22* (2013.01); *B60N 2/42* (2013.01)

(58) Field of Classification Search
CPC ............ B60R 21/207; B60N 2/22; B60N 2/42
See application file for complete search history.

(56) References Cited

U.S. PATENT DOCUMENTS 6,425,602 B1 * 7/2002 Al-Amin ............ B60R 22/1951
280/730.2
7,086,663 B2 * 8/2006 Honda ................ B60R 21/2346
280/736

(Continued)

FOREIGN PATENT DOCUMENTS

WO WO-2022014168 A1 * 1/2022

OTHER PUBLICATIONS

International Search Report for International Application No. PCT/JP2021/002559, dated Mar. 30, 2021, with an English translation.

(Continued)

*Primary Examiner* — Faye M Fleming
(74) *Attorney, Agent, or Firm* — Birch, Stewart, Kolasch & Birch, LLP

(57) ABSTRACT

A coupling structure includes a first coupling portion formed by one end portion of a first tube, and a second coupling portion formed by one end portion of a second tube, and is configured such that the first coupling portion is inserted in the second coupling portion, the first coupling portion and the second coupling portion are coupled, with the second tube being pivotable with respect to the first tube, and a gap is formed between an outer surface of the first coupling portion and an inner surface of the second coupling portion in a first state in which a fluid is not flowing through the flow path, and in a second state in which the fluid is flowing through the flow path, pressure of the fluid causes the first coupling portion to deform to expand toward an outer side of the flow path to reduce the gap.

18 Claims, 16 Drawing Sheets

(56) References Cited

U.S. PATENT DOCUMENTS

| | | | |
|---|---|---|---|
| 7,413,220 B2* | 8/2008 | Itoga | B60R 22/1952 |
| | | | 280/741 |
| 7,556,294 B2 | 7/2009 | Schütt et al. | |
| 9,174,604 B2* | 11/2015 | Wellhoefer | B60N 2/42745 |
| 11,447,086 B2* | 9/2022 | Matsushita | B60R 21/2338 |
| 2022/0410833 A1* | 12/2022 | Ukita | B60R 21/207 |

OTHER PUBLICATIONS

Written Opinion of the International Searching Authority for International Application No. PCT/JP2021/002559, dated Mar. 30, 2021, with an English translation.

\* cited by examiner

COUPLING STRUCTURE, AIRBAG DEVICE, AND VEHICLE SEAT

TECHNICAL FIELD

The present invention relates to a coupling structure, an airbag device equipped with the coupling structure, and a vehicle seat equipped with the airbag device.

BACKGROUND ART

As a structure for coupling two tubes through which a fluid can flow, a structure that couples two tubes with one of the tubes being pivotable with respect to the other tube has been known. For example, Patent Document 1 discloses a tubular rotary joint that couples a holder including a chamber into which a fluid flows, and a shaft including a passage for the fluid therein, with a connection body being rotatable with respect to the holder. In the tubular rotary joint, a supporting hole that passes through the chamber is formed in the holder, and the shaft is rotatably supported in the supporting hole to be rotatable with respect to the holder. Furthermore, in the tubular rotary joint, a seal member is provided between the holder and the shaft to seal the chamber.

CITATION LIST

Patent Document

Patent Document 1: U.S. Pat. No. 7,556,294

SUMMARY OF INVENTION

Technical Problem

Unfortunately, the seal member interposed between the holder and the shaft in the tubular rotary joint disclosed in Patent Document 1 might affect the rotation of the shaft. Wearing of the holder or the shaft may occur due to the seal member, resulting in problems.

The technique of the present disclosure has been made in view of the above-described circumstances, and an object of the present disclosure is to provide a technique capable of achieving both smooth pivoting and fluid sealing property in a structure that couples two tubes through which the fluid can flow with one tube being pivotable with respect to the other tube.

Solution to Problem

To solve the above problems, the technique according to the present disclosure employs the following configuration. That is, the technique of the present disclosure is a coupling structure that couples an upstream tube and a downstream tube disposed on a downstream side of the upstream tube, forming at least a part of a flow path for guiding a fluid from a fluid supply source to a fluid supply target, the coupling structure including: a first coupling portion formed by one end portion of a first tube that is one of the upstream tube and the downstream tube, the end portion including an opening of the first tube; and a second coupling portion formed by one end portion of a second tube that is another of the upstream tube and the downstream tube, the end portion including an opening of the second tube, in which the first coupling portion is inserted in the second coupling portion through the opening of the second tube, with the opening of the first tube positioned on an inner side of the second coupling portion, the first coupling portion and the second coupling portion are coupled, with the second tube being pivotable with respect to the first tube at an angle in a predetermined range at least in a first state in which the fluid is not flowing through the flow path, and a gap is formed between an outer surface of the first coupling portion and an inner surface of the second coupling portion to prevent pivoting of the second tube with respect to the first tube from being hindered in the first state, and in a second state in which the fluid is flowing through the flow path, pressure of the fluid acting on the first coupling portion causes the first coupling portion to deform to expand toward an outer side of the flow path to reduce the gap as compared to the gap in the first state.

Specifically, in the coupling structure according to the present disclosure, the gap is formed between the outer surface of the first coupling portion and the inner surface of the second coupling portion to prevent the pivoting of the second tube with respect to the first tube from being hindered in the first state, and in the second state, the pressure of the fluid causes the first coupling portion to deform to reduce the above-described gap as compared to that in the first state. As a result, the coupling structure according to the present disclosure can achieve both smooth pivoting of the second tube with respect to the first tube in the first state and the fluid sealing property in the second state. Note that "reducing the gap" includes eliminating the gap.

In the coupling structure of the present disclosure, a member for closing the gap is optionally not interposed between the outer surface of the first coupling portion and the inner surface of the second coupling portion. With this configuration, the second tube can more smoothly pivot with respect to the first tube in the first state.

In the coupling structure of the present disclosure, the first coupling portion may be formed by one end portion of the upstream tube including the opening, and the second coupling portion may be formed by one end portion of the downstream tube including the opening. With this configuration, the fluid flows from the upstream tube to the downstream tube in the flow path. Thus, the pressure of the fluid acts on the first coupling portion formed in the upstream tube before on the second coupling portion formed in the downstream tube. Thus, even when the fluid pressure causes the second coupling portion to deform, the first coupling portion can deform to expand toward the outer side of the flow path before the deformation of the second coupling portion. As a result, in the second state, the gap between the first coupling portion and the second coupling portion is swiftly reduced, and thus the fluid sealing property can be swiftly increased.

In the coupling structure of the present disclosure, rigidity of the first coupling portion may be set to be lower than rigidity of the second coupling portion, with the first coupling portion being more likely to deform than the second coupling portion in the second state. With this configuration, when the same fluid pressure acts on the first coupling portion and the second coupling portion in the second state, the first coupling portion can be more likely to deform to expand toward the outer side of the flow path than the second coupling portion. Thus, the reduction of the gap between the outer surface of the first coupling portion and the inner surface of the second coupling portion can be facilitated in the second state.

In the above-described coupling structure, an elastic modulus of a material forming the first coupling portion may be lower than an elastic modulus of a material forming the second coupling portion. With this configuration, the first coupling portion can have lower rigidity than the second coupling portion. The elastic modulus can be expressed by a ratio (stress/strain), using the magnitude of the stress acting on the coupling portion due to the pressure of the fluid, and the magnitude of the strain of the coupling portion due to the stress.

In the above-described coupling structure, at least a part of the first coupling portion may be formed to be thinner than the second coupling portion. Also with this configuration, the first coupling portion can have lower rigidity than the second coupling portion.

In the coupling structure of the present disclosure, a restriction portion may be provided that restricts deformation of the second coupling portion in the second state with the restriction portion coming into contact with the second coupling portion from an outer side. With this configuration, deformation of the second coupling portion to expand toward the outer side of the flow path can be restricted in the second state. As a result, in the second state, approaching of the outer surface of the first coupling portion to the inner surface of the second coupling portion is facilitated, and thus the reduction of the gap between the first coupling portion and the second coupling portion can be facilitated.

The above-described coupling structure may further include a coupling shaft that forms a pivot axis extending in a direction orthogonal to an extending direction of the first tube and couples the first coupling portion and the second coupling portion, with the second tube being pivotable around the pivot axis with respect to the first tube at an angle in a predetermined range at least in the first state, the coupling shaft may include a rod-shaped shaft main body portion that passes through the first coupling portion and the second coupling portion and forms the pivot axis, and clamping portions that are provided at both ends of the shaft main body portion and are in contact with an outer surface of the second coupling portion to clamp the second coupling portion, and the clamping portions may be formed as the restriction portion.

In the coupling structure of the present disclosure, the first coupling portion and the second coupling portion may be coupled, with the second tube being pivotable around a pivot axis extending in a direction orthogonal to an extending direction of the first tube with respect to the first tube at an angle in a predetermined range at least in the first state, the outer surface of the first coupling portion may include a pair of first flat surfaces orthogonal to the pivot axis direction and a pair of first arc surfaces curved to form an arc-shaped surface about the pivot axis, while connecting edges of one side ends and edges of the other side ends of the pair of first flat surfaces, and the inner surface of the second coupling portion may include a pair of second flat surfaces orthogonal to the pivot axis direction and facing the pair of first flat surfaces, and a pair of second arc surfaces curved to form an arc-shaped surface about the pivot axis, while connecting edges of one side ends and edges of the other side ends of the pair of second flat surfaces and facing the pair of first arc surfaces. With this configuration, the first coupling portion and the second coupling portion have similar surfaces (the first flat surface and the second flat surface, the first arc surface and the second arc surface) facing each other. Thus, the above-described gap can have the same size, regardless of the angle of the second tube with respect to the first tube (that is, regardless of the orientation of the second tube) in the first state. As a result, the second tube can more smoothly pivot with respect to the first tube in the first state, and stable sealing property can be guaranteed regardless of the angle of the second tube with respect to the first tube in the second state.

Also, the technique of the present disclosure can be specified as an airbag device equipped with the above-described coupling structure. That is, the technique of the present disclosure may be an airbag device including: an inflator that is a supply source of gas; an airbag that is a supply target of the gas and is expanded with supply of the gas; an upstream tube and a downstream tube disposed on a downstream side of the upstream tube, forming at least a part of a flow path for guiding the gas from the inflator to the airbag; and a coupling structure that couples the upstream tube and the downstream tube, the coupling structure including: a first coupling portion formed by one end portion of a first tube that is one of the upstream tube and the downstream tube, the end portion including an opening of the first tube; and a second coupling portion formed by one end portion of a second tube that is another of the upstream tube and the downstream tube, the end portion including an opening of the second tube, in which the first coupling portion is inserted in the second coupling portion through the opening of the second tube, with the opening of the first tube positioned on an inner side of the second coupling portion, the first coupling portion and the second coupling portion are coupled, with the second tube being pivotable with respect to the first tube at an angle in a predetermined range at least in a first state in which the gas is not flowing through the flow path, and a gap is formed between an outer surface of the first coupling portion and an inner surface of the second coupling portion to prevent pivoting of the second tube with respect to the first tube from being hindered in the first state, and in a second state in which the gas is flowing through the flow path, pressure of the gas acting on the first coupling portion causes the first coupling portion to deform to expand toward an outer side of the flow path to reduce the gap as compared to the gap in the first state.

The technique of the present disclosure may also be a vehicle seat equipped with of the above-described airbag device.

The above-described vehicle seat may include a seating surface portion that supports the buttocks of an occupant, and a backrest portion that supports the back of the occupant and is provided to be reclinable with respect to the seating surface portion, the inflator may be disposed in the seating surface portion, the airbag may be disposed in the backrest portion, and the coupling structure may be provided, with a pivot axis for the second tube to pivot with respect to the first tube and a pivot axis for the backrest portion to recline coinciding with each other. With this configuration in which the inflator is disposed not in the backrest portion but in the seating surface portion, the backrest portion can be made thinner than in a structure in which an inflator is disposed in the backrest portion. Since this is a structure in which gas is supplied to the airbag disposed in the backrest portion from the inflator disposed in the seating surface portion, the downstream tube is required to follow the reclining operation of the backrest portion. In view of this, the vehicle seat of the present disclosure has the pivot axis of the second tube and the pivot axis of the backrest portion coinciding with each other, to enable the downstream tube to favorably follow the reclining operation of the backrest portion.

Advantageous Effects of Invention

With the technique according to the present disclosure, both smooth pivoting and fluid sealing property can be achieved in a structure that couples two tubes through which the fluid can flow with one tube being pivotable with respect to the other tube.

DESCRIPTION OF EMBODIMENTS

The technique of the present disclosure is a coupling structure that couples an upstream tube positioned upstream in a flow path for guiding a fluid from a fluid supply source to a fluid supply target and a downstream tube positioned downstream and forming at least a part of the flow path together with the upstream tube. As an embodiment of the present disclosure, an example in which the coupling structure according to the present disclosure is applied to an airbag device that inflates and expands an airbag (an example of the fluid supply target) with gas (an example of the fluid) supplied from an inflator (an example of the fluid supply source) is described with reference to the drawings. Note that each of the configurations, combinations thereof, and the like in each embodiment is an example, and additions, omissions, substitutions, and other changes of the configuration may be made as appropriate without departing from the spirit of the present invention. The present disclosure is not limited by the embodiments and is limited only by the claims.

First Embodiment

Figure 1:
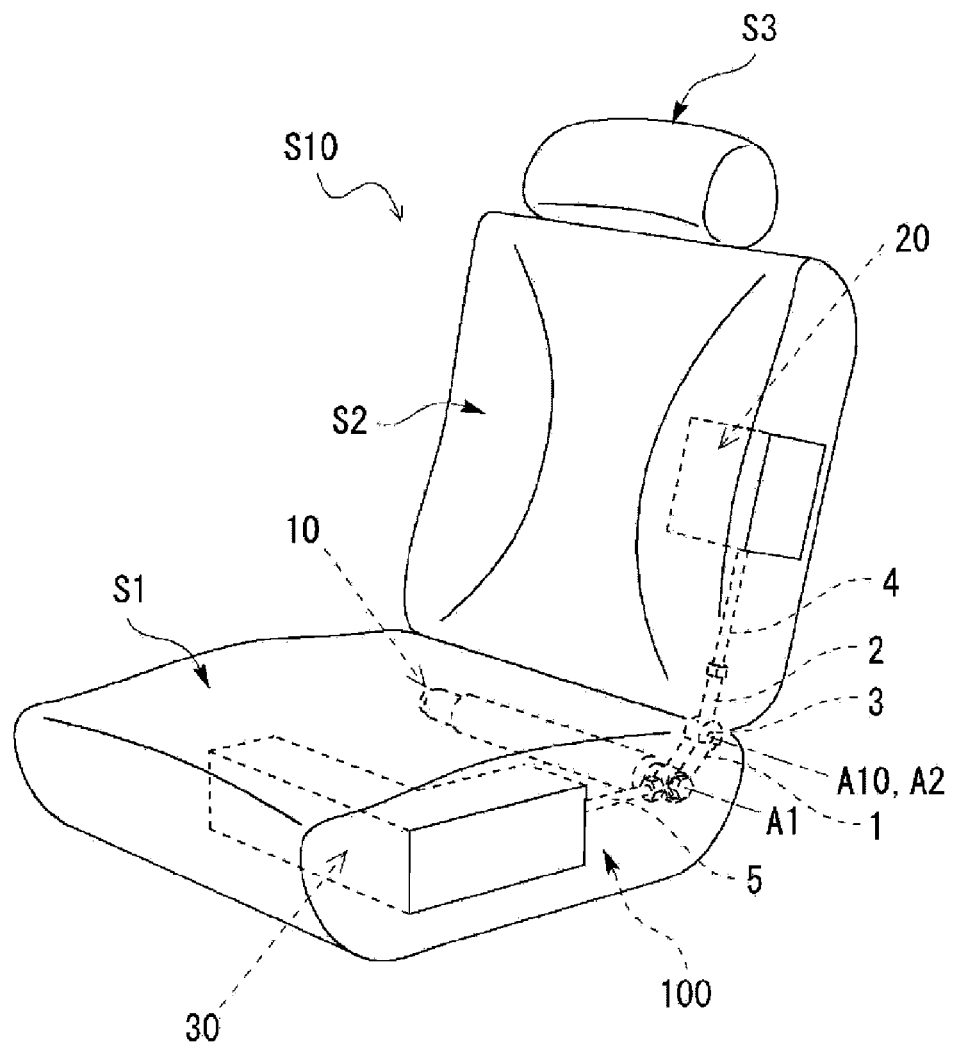
FIG. 1 is a diagram illustrating a state of a vehicle seat equipped with an airbag device according to a first embodiment, in which a seat back is in an upright orientation.
Figure 1:
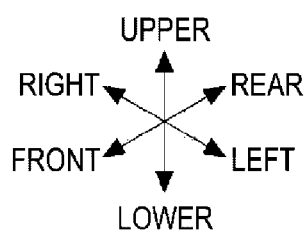
Figure 2:
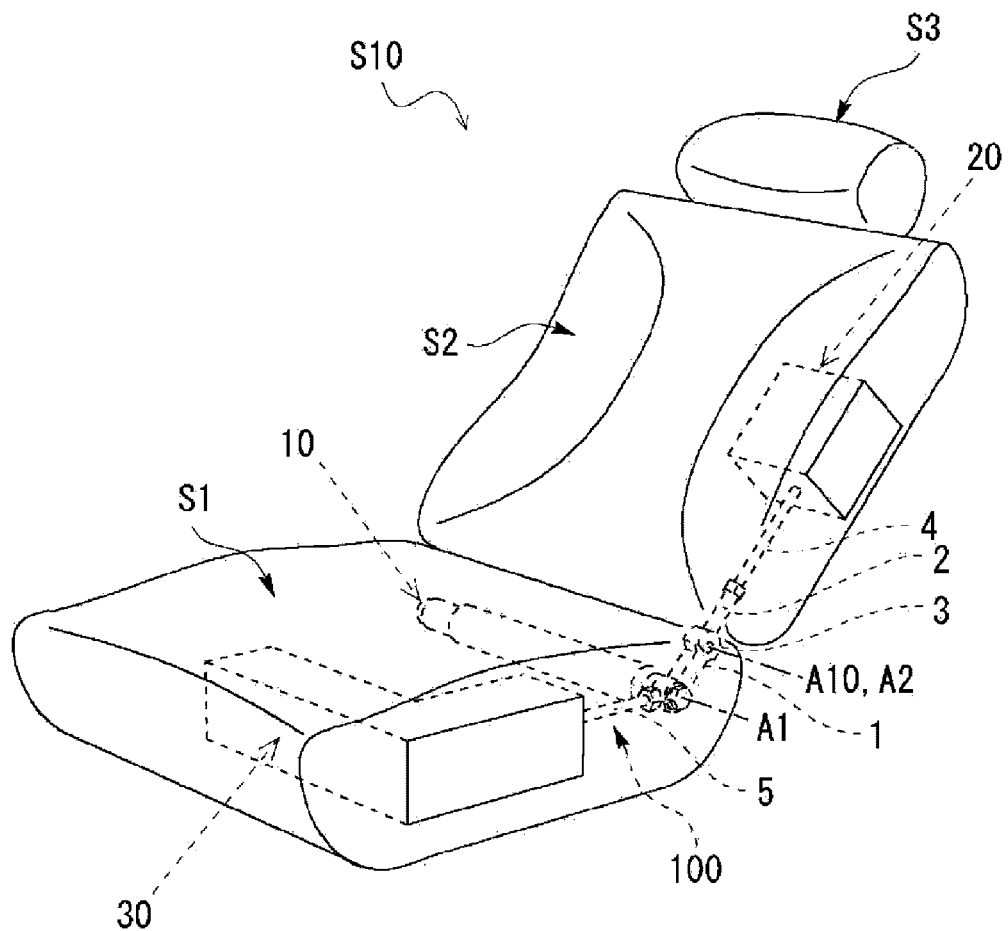
FIG. 2 is a diagram illustrating a state of the vehicle seat equipped with the airbag device according to the first embodiment, in which the seat back is in a reclined orientation.
Figure 2:
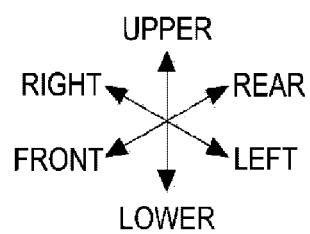

FIG. 1 is a diagram illustrating a state of a vehicle seat equipped with an airbag device according to a first embodiment, in which a seat back is in an upright orientation. FIG. 2 is a diagram illustrating a state of the vehicle seat equipped with the airbag device according to the embodiment, in which the seat back is in a reclined orientation. The vehicle seat S10 is a seat on which an occupant of the vehicle sits. Note that, in the present specification, each direction in the front-rear direction (the depth direction), the left-right direction (the width direction), and the up-down direction (the height direction) of the vehicle seat S10 will be described with reference to each of the directions of the front-rear, left-right, and up-down, as viewed from the occupant (seated person) seated in the vehicle seat S10.

Overall Configuration

As illustrated in FIG. 1 and FIG. 2, the vehicle seat S10 includes a seat cushion (seating surface portion) S1 that supports the buttocks of the occupant, a seat back (backrest portion) S2 that supports the back of the occupant, and a headrest S3 that supports the head of the occupant, corresponding to each part of the body of the occupant seated. The seat back S2 is connected to the rear end portion of the seat cushion S1, to be reclinable with respect to the seat cushion S1. In the vehicle seat S10, by pivoting the seat back S2 about a seat back pivot axis A10 in accordance with the operation of the occupant, the orientation of the seat back S2 can be changed in the range from the upright orientation in which the seat back S2 is raised as illustrated in FIG. 1 to the reclined orientation in which the seat back S2 is reclined as illustrated in FIG. 2. This allows the angle of the seat back S2 to be adjusted. Hereinafter, the operation of changing the orientation of the seat back S2 between the upright orientation and the reclined orientation is referred to as a reclining operation. The headrest S3 is connected to the upper end portion of the seat back S2, to be in an up-down movable manner with respect to the seat back S2.

[Airbag Device]

Figure 3:
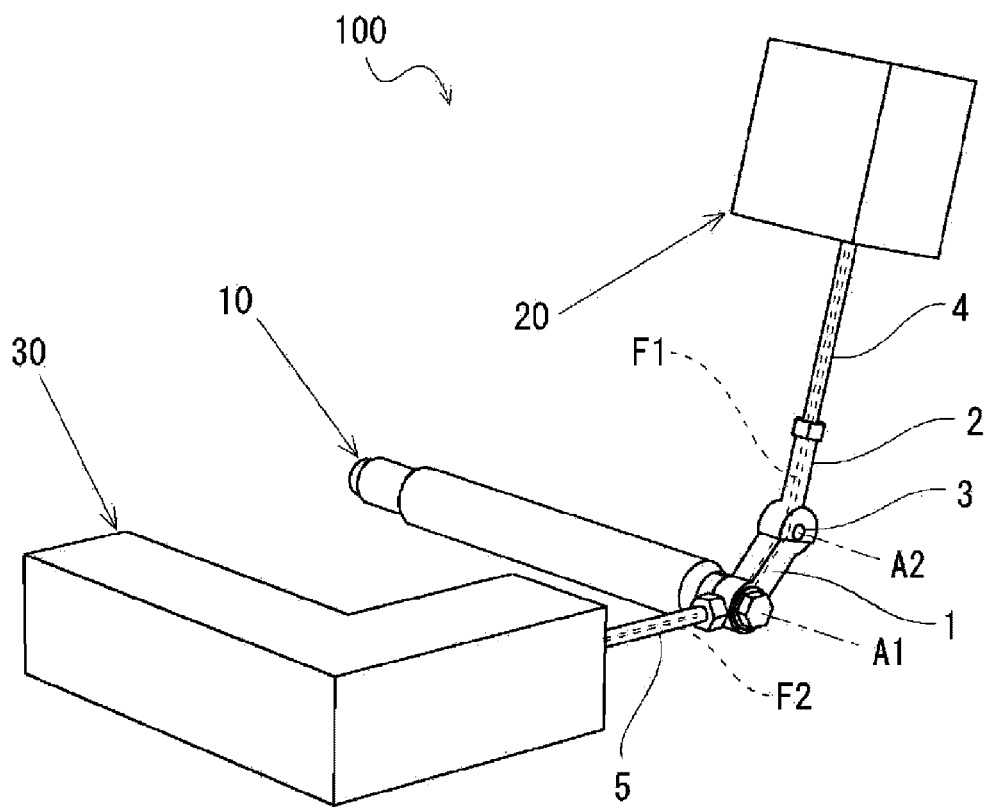
FIG. 3 is a perspective view of the airbag device according to the first embodiment.
Figure 3:
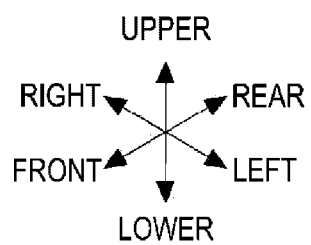

As illustrated in FIG. 1 and FIG. 2, the vehicle seat S10 according to the present embodiment includes an airbag device 100 that inflates and expands the airbag at the time of a collision of the vehicle to restrain and protect the occupant. FIG. 3 is a perspective view of the airbag device 100 according to the present embodiment. As illustrated in FIG. 3, the airbag device 100 includes an inflator 10 that is a gas supply source, and a first airbag 20 and a second airbag 30 that are gas supply targets and are inflated and expanded with supply of gas. The airbag device 100 according to the present embodiment employs a structure in which gas is supplied to each airbag by the inflator disposed in the seat cushion S1, without any inflator disposed in the seat back S2. Thus, the seat back is made thinner than in a structure in which an inflator is disposed in the seat back. The airbag device 100 further includes an upstream tube 1, a downstream tube 2, a coupling shaft 3, a first conduit 4, and a second conduit 5. Each component of the airbag device 100 will be described below.

[Inflator]

The inflator 10 is disposed in the seat cushion S1, and supplies gas to the first airbag 20 and the second airbag 30. The inflator 10 is formed in a cylinder shape, and discharges gas from the inside of the inflator by being actuated under the control of an airbag ECU mounted on the vehicle. Note that the method by which the inflator according to the present disclosure generates gas is not particularly limited. The type of gas generator includes a pyro-type that generates gas by combusting a solid gas generating agent, a stored gas-type that uses pressurized gas, a hybrid type combining the pyro-type and the stored gas-type, for example.

[Airbag]

The first airbag 20 and the second airbag 30 are disposed (stored) in the portions of the vehicle seat S10 corresponding to the parts of the occupant. Specifically, the first airbag 20 is a chest airbag and is disposed in the seat back S2. The first airbag 20 is inflated and expanded with supply of gas to restrain the chest of the occupant, thereby protecting the chest of the occupant. The first airbag 20 corresponds to an "airbag" according to the present disclosure. The second airbag 30 is a thigh airbag and is disposed in the seat cushion S1. The second airbag 30 is inflated and expanded with supply of gas to lift the thighs of the occupant, thereby preventing the occupant from taking any posture to slide into the front of the vehicle seat S10 (what is called seatbelt submarining). Airbags according to the technique of the present disclosure are not limited to chest airbags and thigh airbags (for preventing seatbelt submarining).

[Tubes]

The upstream tube 1, the downstream tube 2, the first conduit 4, and the second conduit 5 are tubes through which gas can flow, and form a flow path for supplying gas to each airbag. Here, reference sign F1 denotes a flow path for guiding gas from the inflator 10 to the first airbag 20. In the airbag device 100, in the order from the upstream side to the downstream side of the flow path F1, the inflator 10, the upstream tube 1, the downstream tube 2, the first conduit 4, and the first airbag 20 are coupled and are in communication with each other. Thus, the upstream tube 1, the downstream tube 2, and the first conduit 4 form the flow path F1. That is, part of the gas discharged from the inflator 10 flows from the inflator 10 through the upstream tube 1, the downstream tube 2, and the first conduit 4 in this order, and is supplied to the first airbag 20. Reference sign F2 denotes a flow path for guiding gas from the inflator 10 to the second airbag 30. In the airbag device 100, in the order from the upstream side to the downstream side of the flow path F2, the inflator 10, the upstream tube 1, the second conduit 5, and the second airbag 30 are coupled and are in communication with each other. That is, part of the gas discharged from the inflator 10 flows from the inflator 10 through the upstream tube 1 and the second conduit 5 in this order, and is supplied to the second airbag 30.

Here, in the airbag device 100, the inflator 10 and the upstream tube 1 are coupled with the upstream tube 1 being pivotable with respect to the inflator 10 while maintaining the communication state with the inflator 10. The upstream tube 1 and the downstream tube 2 are coupled with the downstream tube 2 being pivotable with respect to the upstream tube 1 while maintaining the communication state with the upstream tube 1. Reference sign A1 in FIG. 3 indicates a first pivot axis for the upstream tube 1 to pivot with respect to the inflator 10. Reference sign A2 indicates a second pivot axis for the downstream tube 2 to pivot with respect to the upstream tube 1. The first pivot axis A1 and the second pivot axis A2 extend in a direction orthogonal to the extending direction of the upstream tube 1. As illustrated in FIG. 1 and FIG. 2, the first pivot axis A1 and the second pivot axis A2 are parallel to the seat back pivot axis A10 for the seat back S2 to recline, and the second pivot axis A2 coincides with the seat back pivot axis A10.

Figure 4:
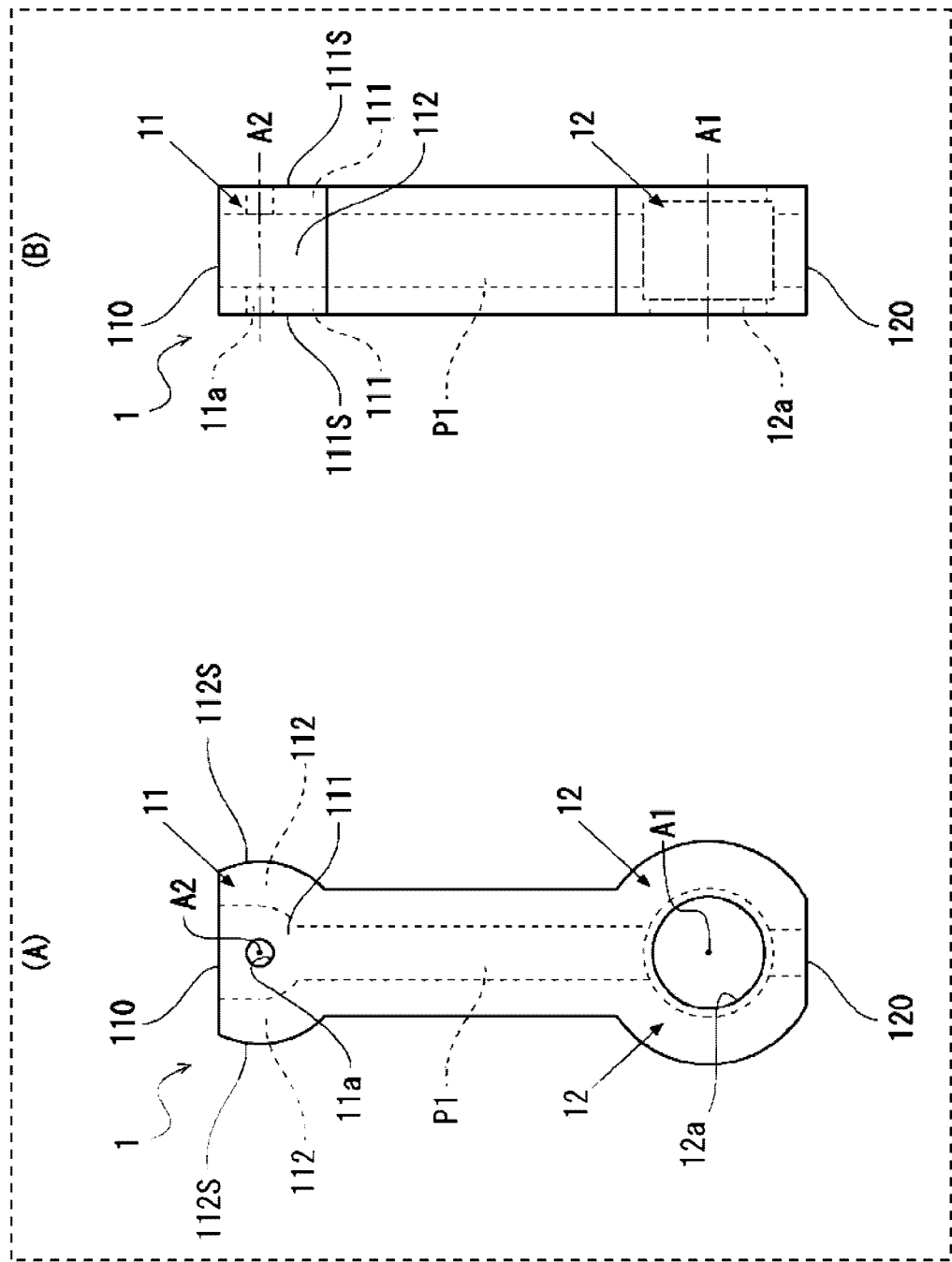
FIGS. 4(A) and 4(B) are diagrams for illustrating an upstream tube.

FIGS. 4(A) and 4(B) are diagrams for describing the upstream tube 1. In the present embodiment, the upstream tube 1 is a "first tube" according to the present disclosure. The upstream tube 1 is formed in a tubular shape with a resin material. Reference sign P1 indicates an internal space of the upstream tube 1. One end portion of the upstream tube 1 is provided with a first outflow opening 110 that is an opening through which the gas to be supplied to the first airbag 20 flows out from the internal space P1. The first outflow opening 110 is in communication with the internal space P1. The other end portion of the upstream tube 1 is provided with a second outflow opening 120 that is an opening through which the gas to be supplied to the second airbag 30 flows out from the internal space P1. The second outflow opening 120 is in communication with the internal space P1.

Here, among both end portions of the upstream tube 1, the end portion (the above-described one end portion) including the first outflow opening 110 forms a first coupling portion 11 for coupling the upstream tube 1 and the downstream tube 2. The first coupling portion 11 is thus formed by a part of the upstream tube 1 including the first outflow opening 110. The first coupling portion 11 is provided with a through-hole 11a provided through the first coupling portion 11 in the second pivot axis A2 direction. The center axis of the through-hole 11a coincides with the second pivot axis A2. The through-hole 11a is in communication with the internal space P1 of the upstream tube 1.

The first coupling portion 11 includes a pair of first flat walls 111, 111 facing each other and a pair of first arc walls 112, 112 facing each other. The pair of first flat walls 111, 111 extend in the direction orthogonal to the second pivot axis A2 direction. The pair of first arc walls 112, 112 are walls connecting edges of one side ends and edges of the other side ends of the pair of first flat walls 111, 111. As illustrated in FIG. 4(A), the pair of first arc walls 112, 112 are curved in an arc shape about the second pivot axis A2.

Thus, a pair of first flat surfaces 111S, 111S that are surfaces of the pair of first flat walls 111, 111, in the outer surface of the first coupling portion 11 (the surface on the side opposite to the surface defining the internal space P1) extend to be orthogonal to the second pivot axis A2 direction. A pair of first arc surfaces 112S, 112S that are surfaces of the pair of first arc walls 112, 112, in the outer surface of the first coupling portion 11 are curved to form an arc-shaped surface about the second pivot axis A2, while connecting edges of one side ends and edges of the other side ends of the pair of first flat surfaces 111S, 111S.

Of both end portions of the upstream tube 1, the end portion (the above-described other end portion) including the second outflow opening 120 forms an inflator coupling portion 12 for coupling the inflator 10 and the upstream tube 1. The inflator coupling portion 12 is thus formed by a part of the upstream tube 1 including the second outflow opening 120. The inflator coupling portion 12 is provided with a through-hole 12a provided through the inflator coupling portion 12 in the first pivot axis A1 direction. The center axis of the through-hole 12a coincides with the first pivot axis A1. The through-hole 12a is in communication with the internal space P1 of the upstream tube 1.

Figure 5:
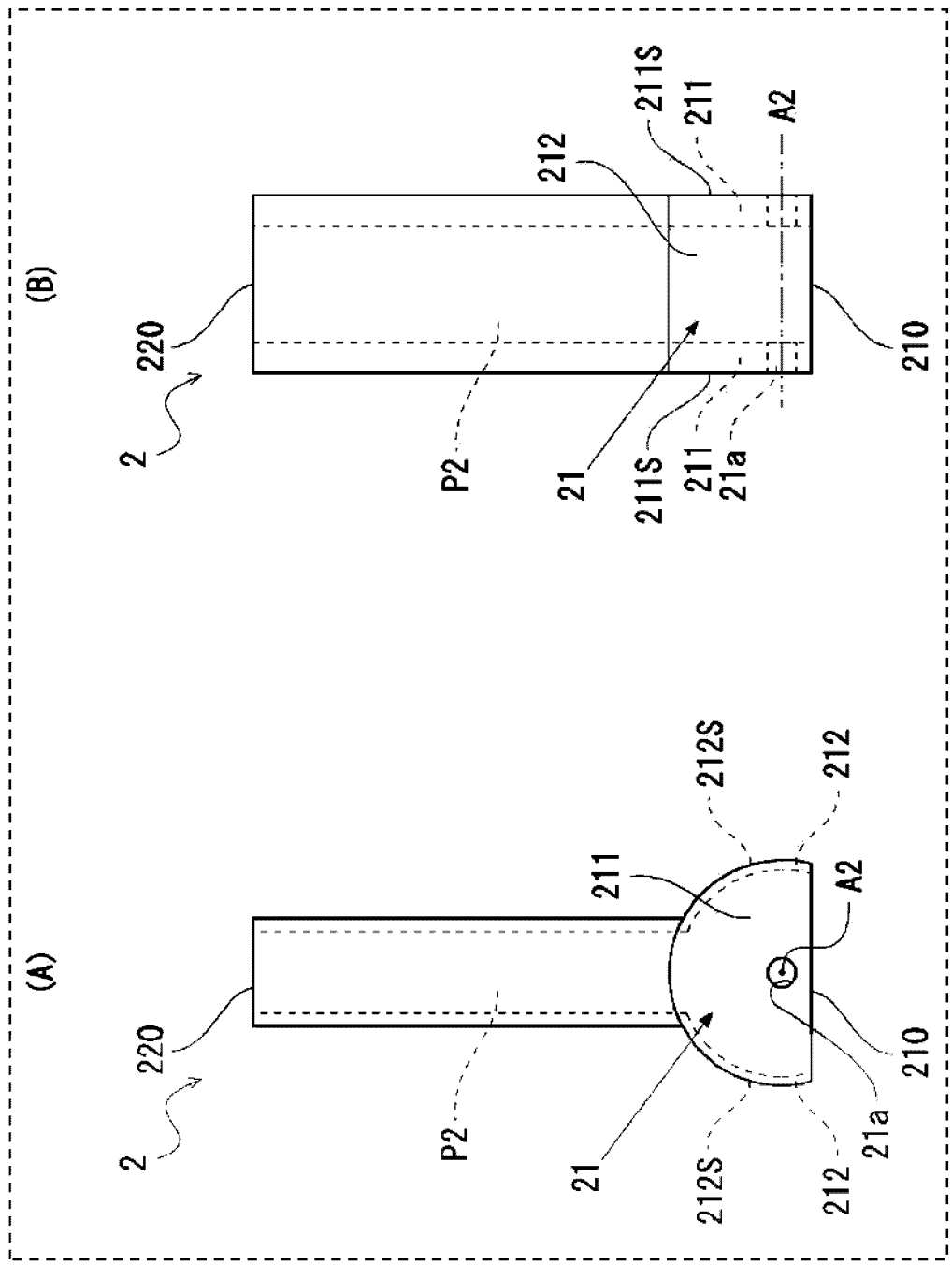
FIGS. 5(A) and 5(B) are diagrams for illustrating a downstream tube.

FIGS. 5(A) and 5(B) are diagrams for describing the downstream tube 2. In the present embodiment, the downstream tube 2 is a "second tube" according to the present disclosure. The downstream tube 2 is formed in a tubular shape with a metal material. Reference sign P2 indicates an internal space of the downstream tube 2. One end portion of the downstream tube 2 is provided with an inflow opening 210 that is an opening through which the gas flowing out from the first outflow opening 110 of the upstream tube 1 flows into the internal space P2 of the downstream tube 2. The inflow opening 210 is in communication with the internal space P2. The other end portion of the downstream tube 2 is provided with an outflow opening 220 that is an opening through which the gas to be supplied to the first airbag 20 flows out from the internal space P2. The outflow opening 220 is in communication with the internal space P2.

Here, of both end portions of the downstream tube 2, the end portion (the above-described one end portion) including the inflow opening 210 forms a second coupling portion 21 for coupling the upstream tube 1 and the downstream tube 2. The second coupling portion 21 is thus formed by a part of the downstream tube 2 including the inflow opening 210. The second coupling portion 21 is provided with a through-hole 21a provided through the second coupling portion 21 in the second pivot axis A2 direction. The center axis of the through-hole 21a coincides with the second pivot axis A2. The through-hole 21a is in communication with the internal space P2 of the downstream tube 2.

The second coupling portion 21 includes a pair of second flat walls 211, 211 facing each other and a pair of second arc walls 212, 212 facing each other. The pair of second flat walls 211, 211 extend in the direction orthogonal to the second pivot axis A2 direction. The pair of second arc walls 212, 212 are walls connecting edges of one side ends and edges of the other side ends of the pair of second flat walls 211, 211. As illustrated in FIG. 5(A), the pair of second arc walls 212, 212 are curved in an arc shape about the second pivot axis A2.

Thus, a pair of second flat surfaces 211S, 211S that are surfaces of the pair of second flat walls 211, 211, in the inner surface of the second coupling portion 21 (the surface defining the internal space P2) extend to be orthogonal to the second pivot axis A2 direction. A pair of second arc surfaces 212S, 212S that are surfaces of the pair of second arc walls 212, 212, in the outer surface of the second coupling portion 21 are curved to form an arc-shaped surface about the second pivot axis A2, while connecting edges of one side ends and edges of the other side ends of the pair of second flat surfaces 211S, 211S.

[Coupling Between Members]

Figure 6:
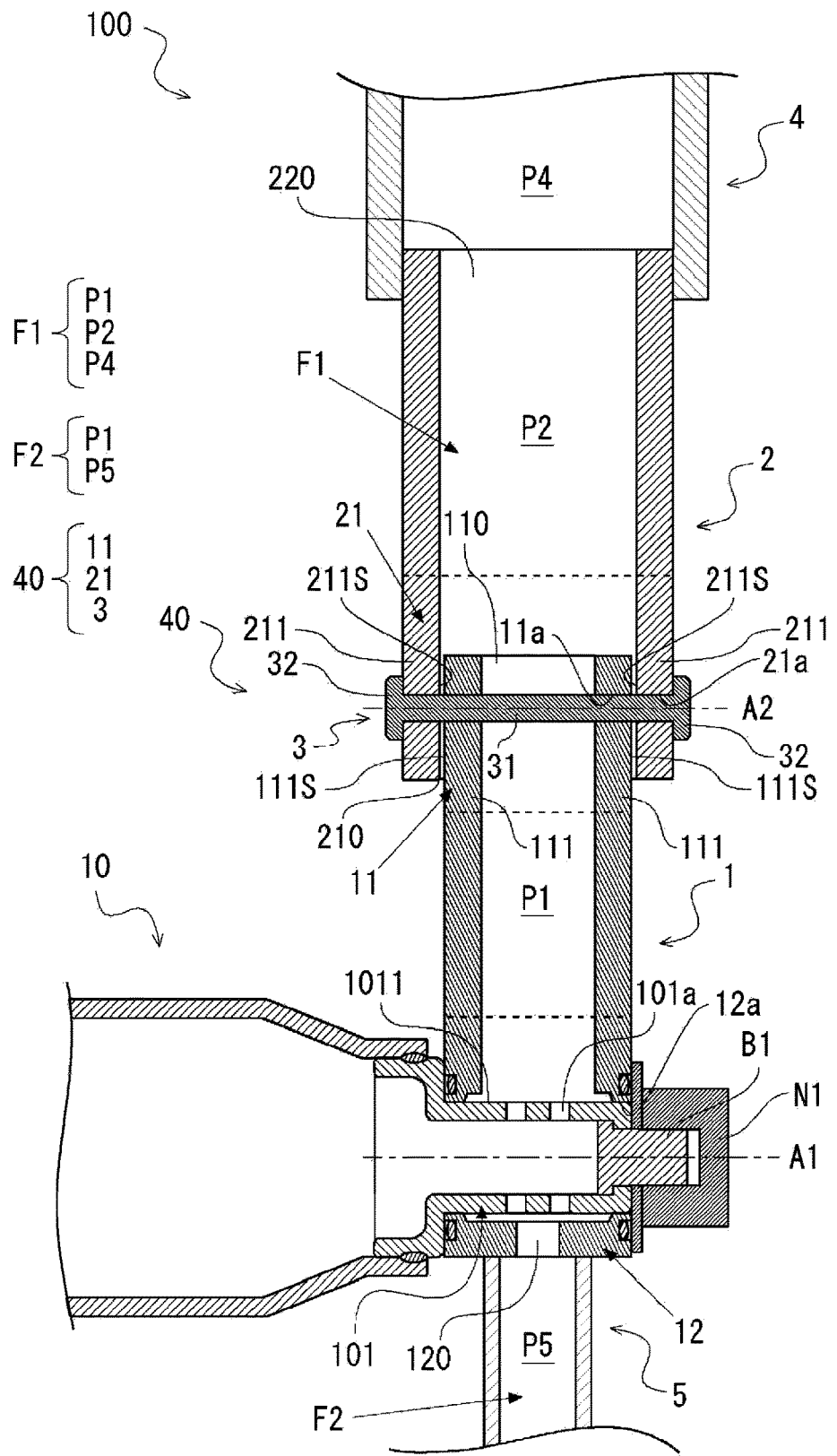
FIG. 6 is a diagram (1) for illustrating coupling between members of the airbag device.
Figure 7:
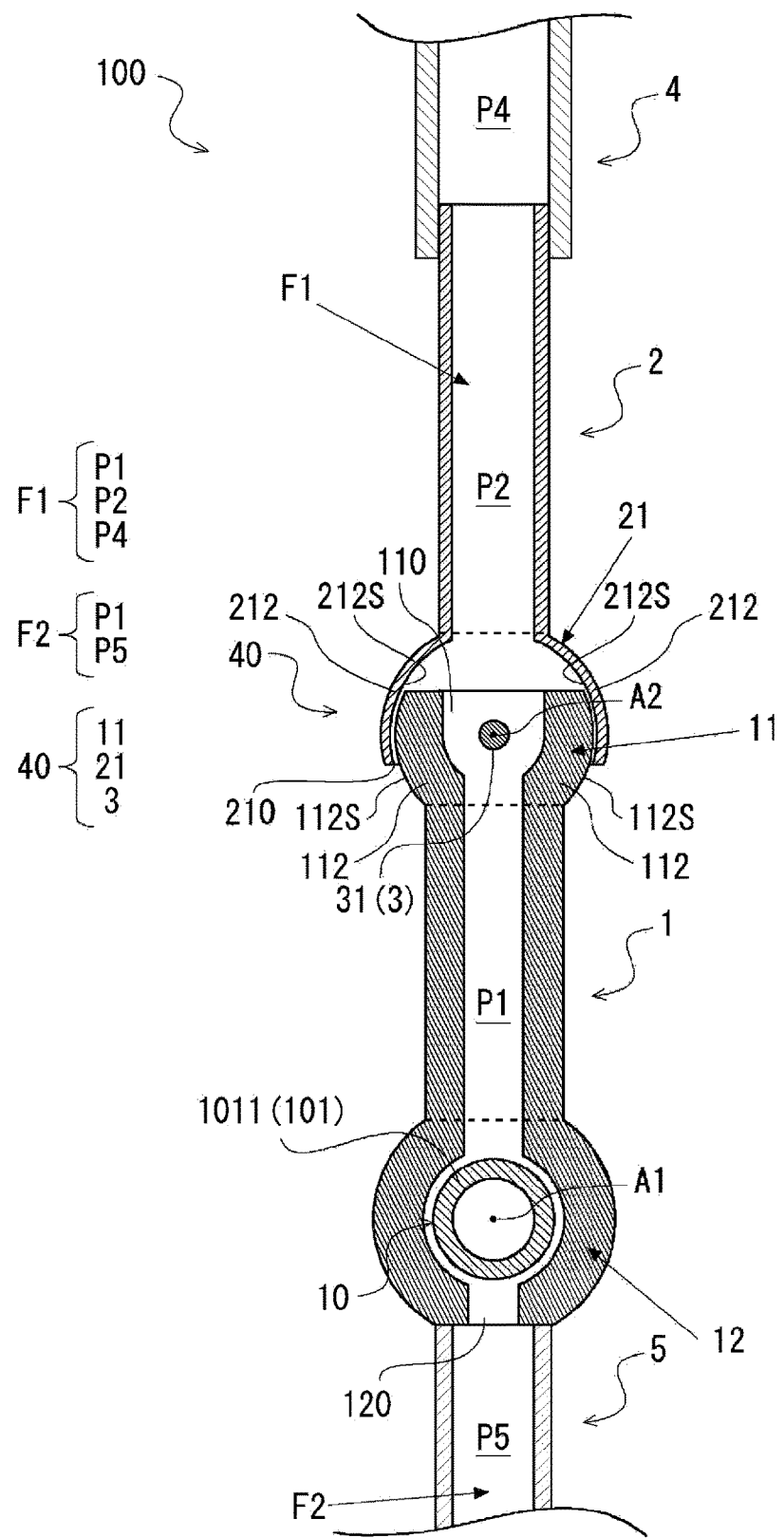
FIG. 7 is a diagram (2) for illustrating coupling between members of the airbag device.

FIG. 6 and FIG. 7 are diagrams illustrating coupling between members of the airbag device 100. FIG. 6 illustrates a cross-section along the first pivot axis A1 and the second pivot axis A2. FIG. 7 illustrates a cross-section orthogonal to the first pivot axis A1 and the second pivot axis A2. In FIG. 6 and FIG. 7, the orientations of the upstream tube 1 and the downstream tube 2 are determined to make the extending directions of the upstream tube 1 and the downstream tube 2 coincide with each other (that is, to make the upstream tube 1 and the downstream tube 2 linearly arranged). Note that FIG. 6 and FIG. 7 illustrate a state before the inflator 10 is actuated, that is, a state in which no gas is flowing through the flow path F1 (hereinafter, also referred to as a first state). Note that in FIG. 6 and FIG. 7, reference signs P4 and P5 respectively denote the internal spaces of the first conduit 4 and the second conduit 5. The flow path F1 through which the gas to be supplied to the first airbag 20 flows is formed by the internal space P1 of the upstream tube 1, the internal space P2 of the downstream tube 2, and the internal space P4 of the first conduit 4. The flow path F2 through which the gas to be supplied to the second airbag 30 flows is formed by the internal space P1 of the upstream tube 1 and the internal space P5 of the second conduit 5. Now, coupling between the inflator 10 and the upstream tube 1 and coupling between the upstream tube 1 and the downstream tube 2 will be described in detail.

[Coupling Between Inflator and Upstream Tube]

First of all, the coupling between the inflator and the upstream tube will be described. As illustrated in FIG. 6, the inflator 10 is provided with a cup-shaped protruding diffuser 101 having a circumferential wall 1011 in which a plurality of gas discharge ports 101a, for discharging gas, are formed to be arranged along a circumferential direction. Further, a bolt B1 protrudes from the distal end of the diffuser 101.

The upstream tube 1 is coupled to the inflator 10, with the diffuser 101 inserted in the internal space P1 of the upstream tube 1 through the through-hole 12a of the inflator coupling portion 12 and a nut N1 attached to the bolt B1 protruding from the through-hole 12a.

The upstream tube 1 is in a state of being rotatably supported on the diffuser 101, and is pivotable about the first pivot axis A1 while sliding on the circumferential wall of the diffuser 101 in the inflator coupling portion 12. Furthermore, the nut N1 prevents the diffuser 101 from falling out from the through-hole 12a, and maintains the coupled state between the inflator 10 and the upstream tube 1.

Also, as illustrated in FIG. 7, the circumferential wall 1011 of the diffuser 101 is surrounded by the internal space P1 of the upstream tube 1. Thus, gas discharged from the plurality of gas discharge ports 101a formed in the circumferential wall 1011 flows into the internal space P1.

[Coupling Between Upstream Tube and Downstream Tube]

Next, the coupling between the upstream tube 1 and the downstream tube 2 will be described. As illustrated in FIG. 6 and FIG. 7, the first coupling portion 11 of the upstream tube 1 and the second coupling portion 21 of the downstream tube 2 are coupled via the coupling shaft 3, and thus the upstream tube 1 and the downstream tube 2 are coupled. The coupling shaft 3 includes a rod-shaped shaft main body portion 31, and clamping portions 32 that are provided at both ends of the shaft main body portion 31 and have a larger diameter than the shaft main body portion 31.

A configuration for coupling the upstream tube 1 and the downstream tube 2, including the first coupling portion 11 of the upstream tube 1, second coupling portion 21 of the downstream tube 2, and the coupling shaft 3, is defined as a coupling structure 40. As illustrated in FIG. 6, in the coupling structure 40, the first coupling portion 11 is inserted in the second coupling portion 21 through the inflow opening 210 of the downstream tube 2 with the first outflow opening 110 of the upstream tube 1 positioned on the inner side of the second coupling portion 21. The first coupling portion 11 and the second coupling portion 21 are coupled with the clamping portions 32 clamping the second coupling portion 21 from both sides in the direction of the second pivot axis A2, in a state in which the shaft main body portion 31 of the coupling shaft 3 passes through the through-hole 11a of the first coupling portion 11 and the through-hole 21a of the second coupling portion 21.

Thus, the second pivot axis A2 is defined by the shaft main body portion 31, and the downstream tube 2 is rotatably supported on the coupling shaft 3 to be pivotable about the second pivot axis A2. With the clamping portions 32 being in contact with the second flat walls 211 of the second coupling portion 21 from the outer side, the coupling shaft 3 is prevented from falling off from the through-hole 11a and the through-hole 21a, and thus the coupled state between the first coupling portion 11 and the second coupling portion 21 is maintained.

With the upstream tube 1 and the downstream tube 2 coupled, the internal space P1 of the upstream tube 1 and the internal space P2 of the downstream tube 2 are in communication, and thus a part of the flow path F1 is formed. The airbag device may not include the first conduit 4, and the flow path F1 may be entirely formed by the upstream tube 1 and the downstream tube 2. In other words, the downstream tube 2 may be directly coupled to the first airbag 20 without the first conduit 4 being interposed therebetween.

In the vehicle seat S10 having the inflator 10 disposed in the seat cushion S1 and the first airbag 20 for the chest disposed in the seat back S2, the orientation of the downstream tube 2 is required to be changed in accordance with a change in the orientation of the seat back S2 as illustrated in FIG. 1 and FIG. 2. In view of this, the downstream tube 2 can pivot about the second pivot axis A2 with respect to the upstream tube 1 at an angle in a predetermined range at least in the first state, to be capable of following the reclining operation of the seat back S2. The predetermined range is defined so as to be equal to or greater than a range of angles at least required for the downstream tube 2 to follow the reclining operation of the seat back S2.

Figure 8:
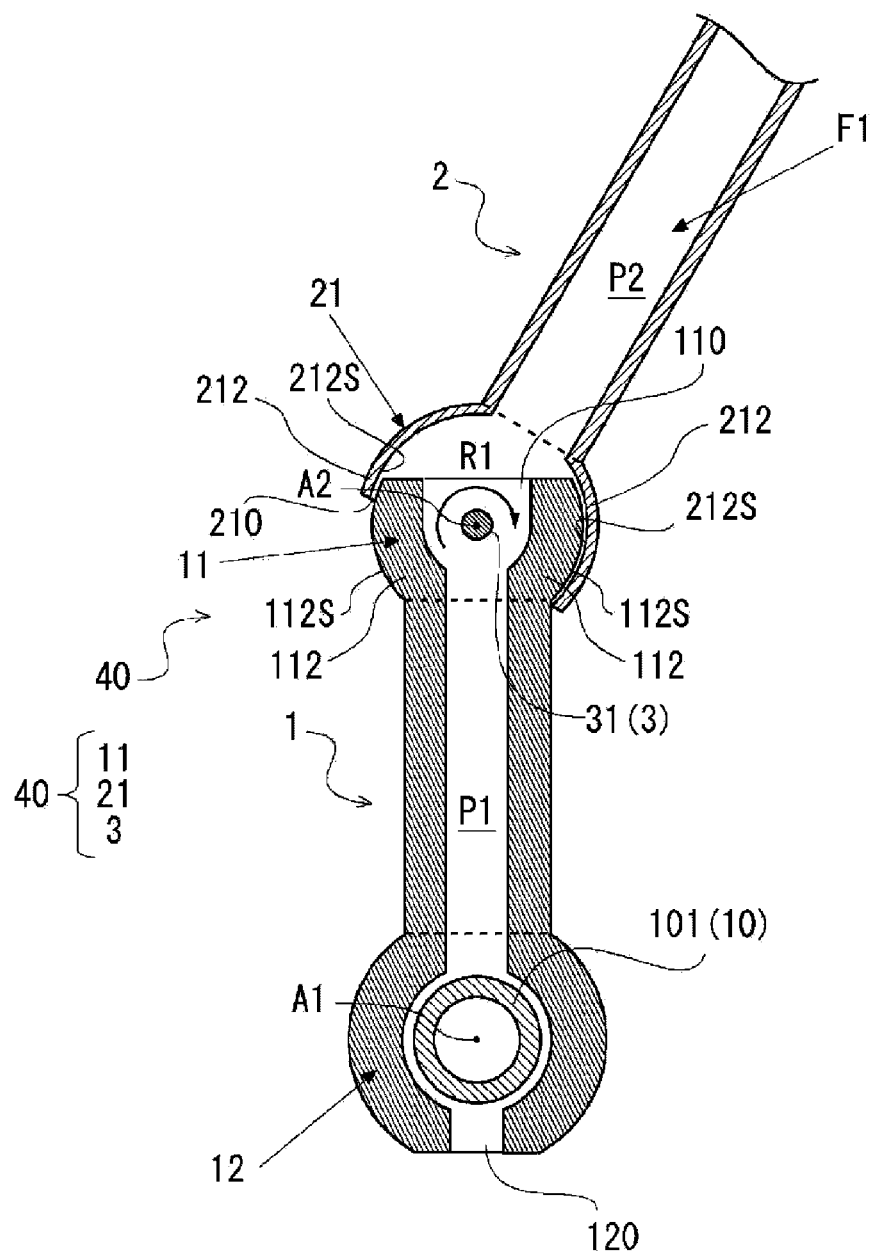
FIG. 8 is a diagram illustrating a state as a result of the maximum pivoting of the downstream tube about a second pivot axis in a first direction with respect to the upstream tube.
Figure 9:
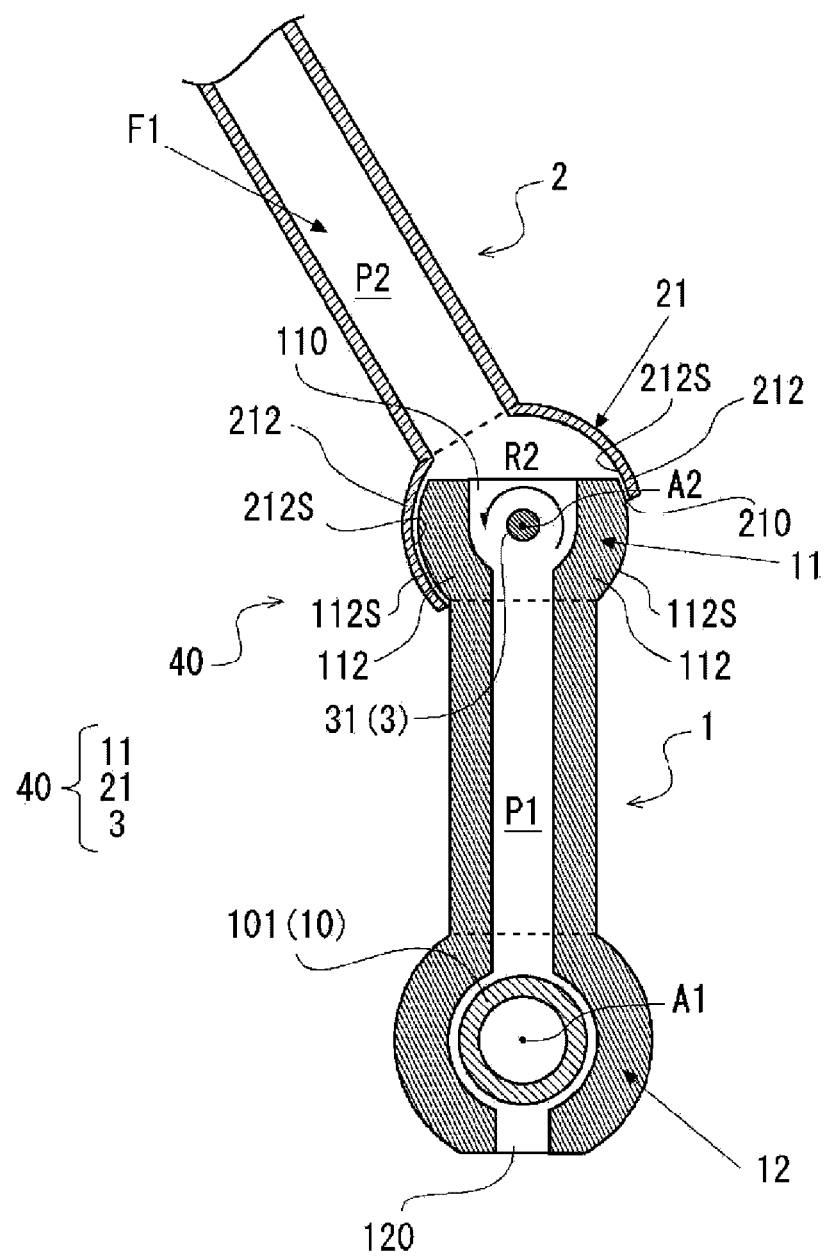
FIG. 9 is a diagram illustrating a state as a result of the maximum pivoting of the downstream tube about the second pivot axis in a second direction with respect to the upstream tube.

FIG. 8 is a diagram illustrating a state as a result of the maximum pivoting of the downstream tube 2 about the second pivot axis A2 in a first direction R1 with respect to the upstream tube 1. FIG. 9 is a diagram illustrating a state as a result of the maximum pivoting of the downstream tube 2 about the second pivot axis A2 in a second direction R2 with respect to the upstream tube 1. FIG. 8 and FIG. 9 illustrate a cross-section orthogonal to the first pivot axis A1 and the second pivot axis A2. The first direction R1 and the second direction R2 are opposite to each other. FIG. 8 and FIG. 9 illustrate the first state in which no gas is flowing through the flow path F1. The downstream tube 2 is pivotable about the second pivot axis A2 with respect to the upstream tube 1 in a range from the angle illustrated in FIG. 8 to the angle illustrated in FIG. 9, at least in the first state. As illustrated in FIG. 8 and FIG. 9, in the coupling structure 40, regardless of whether gas is flowing through the flow path F1, a state is maintained in which the first coupling portion 11 is inserted in the second coupling portion 21 with the first outflow opening 110 of the upstream tube 1 positioned on the inner side of the second coupling portion 21 (that is, in the internal space P2) at an angle within the predetermined range. Thus, regardless of the angle of the downstream tube 2 with respect to the upstream tube 1 (that is, regardless of the orientation of the downstream tube 2), the first outflow opening 110 of the upstream tube 1 is covered by the second coupling portion 21, and thus the gas flowing out from the first outflow opening 110 of the upstream tube 1 can flow into the internal space P2 of the downstream tube 2. In addition, regardless of the orientation of the downstream tube 2, a state is maintained in which the first flat surface 111S of the first coupling portion 11 and the second flat surface 211S of the second coupling portion 21 face each other, and the first arc surface 112S of the first coupling portion 11 and the second arc surface 212S of the second coupling portion 21 face each other.

[Airbag Expanding Operation]

Next, the expanding operation of the airbags in the airbag device 100 according to the embodiment will be described. When the airbag ECU detects a collision of the vehicle based on a signal from a collision sensor (not illustrated), an actuation current (ignition current) is supplied to the inflator 10. As a result, the inflator 10 is actuated, and gas is ejected from the gas discharge ports 101a. The gas ejected from the gas discharge ports 101a flows into the internal space P1 of the upstream tube 1. Part of the gas flowing into the internal space P1 of the upstream tube 1 flows through the upstream tube 1, and flows into the internal space P2 of the downstream tube 2 through the first outflow opening 110. The gas flowing into the internal space P2 of the downstream tube 2 flows through the downstream tube 2, and flows into the internal space P4 of the first conduit 4 through the outflow opening 220. The gas flowing into the internal space P4 of the first conduit 4 flows through the first conduit 4, and flows into the first airbag 20. Part of the gas flowing into the upstream tube 1 from the inflator 10 flows through the flow path F1 and is supplied to the first airbag 20, in the manner described above. As a result, the first airbag 20 is inflated and expanded. The remainder of the gas flowing into the upstream tube 1 from the inflator 10 flows into the internal space P5 of the second conduit 5 through the second outflow opening 120. The gas flowing into the internal space P5 of the second conduit 5 flows through the second conduit 5, and flows into second airbag 30. The remainder of the gas flowing into the upstream tube 1 from the inflator 10 flows through the flow path F2 and is supplied to the second airbag 30, in the manner described above. As a result, the second airbag 30 is inflated and expanded. With the first airbag 20 and the second airbag 30 expanded, the occupant is protected from an impact.

[Clearance]

In a state before the inflator 10 is actuated, that is, in the first state in which no gas is flowing through the flow path F1, the downstream tube 2 is required to pivot smoothly with respect to the upstream tube 1, to prevent the reclining operation of the seat back S2 from being hindered. In view of this, in the first state, a gap (clearance) needs to be formed between the first coupling portion 11 and the second coupling portion 21 for couping the upstream tube 1 and the downstream tube 2, to prevent the pivoting of the downstream tube 2 with respect to the upstream tube 1 from being hindered. On the other hand, in a state in which the inflator 10 is actuated and the gas flows through the flow path F1 (hereinafter, also referred to as a second state), the gas is required not to leak out through the gap described above. In order to guarantee the sealing property (sealability) in the second state, a seal member for closing the above-described gap may be provided between the first coupling portion 11 and the second coupling portion 21. However, with such a configuration, the seal member may hinder the smooth pivoting of the downstream tube 2 with respect to the upstream tube 1.

In view of this, the coupling structure 40 is configured to be capable of making the downstream tube 2 pivot smoothly with respect to the upstream tube 1 in the first state, and guaranteeing the gas sealing property in the second state. This will be described in detail below.

Figure 10:
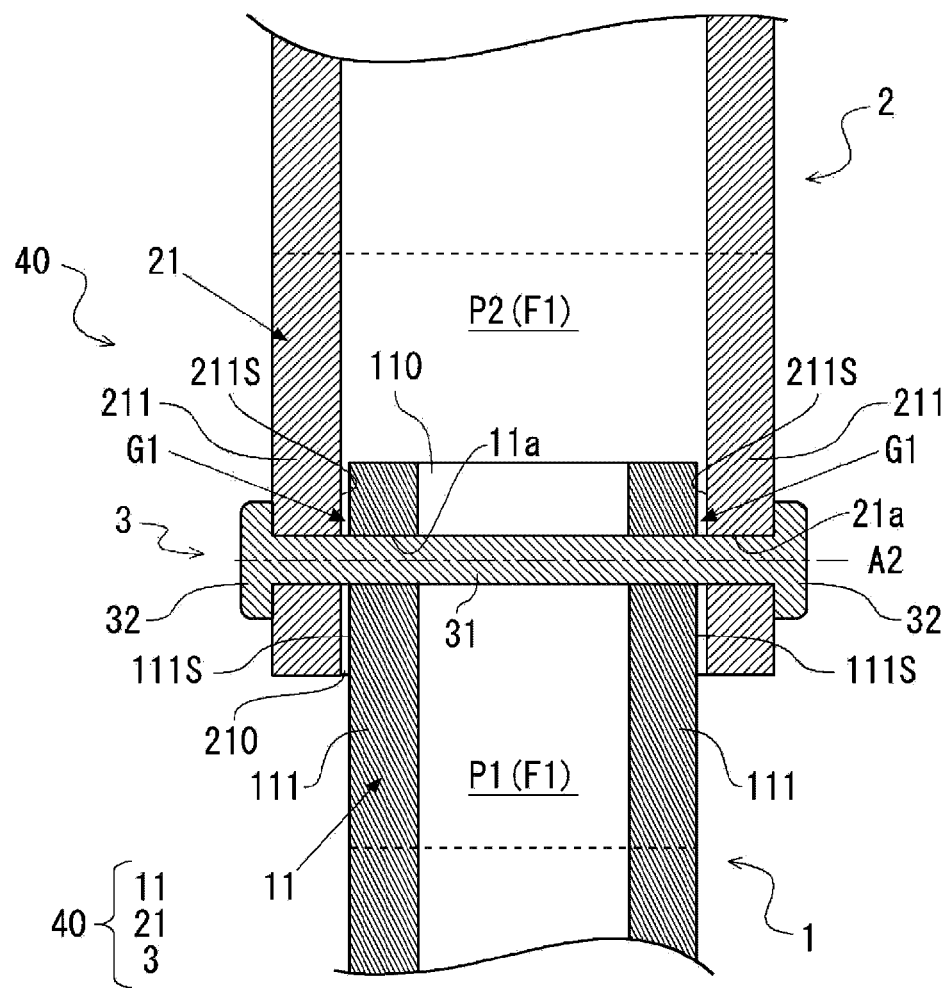
FIG. 10 is a diagram (1) illustrating a coupling structure according to the first embodiment in a first state.
Figure 11:
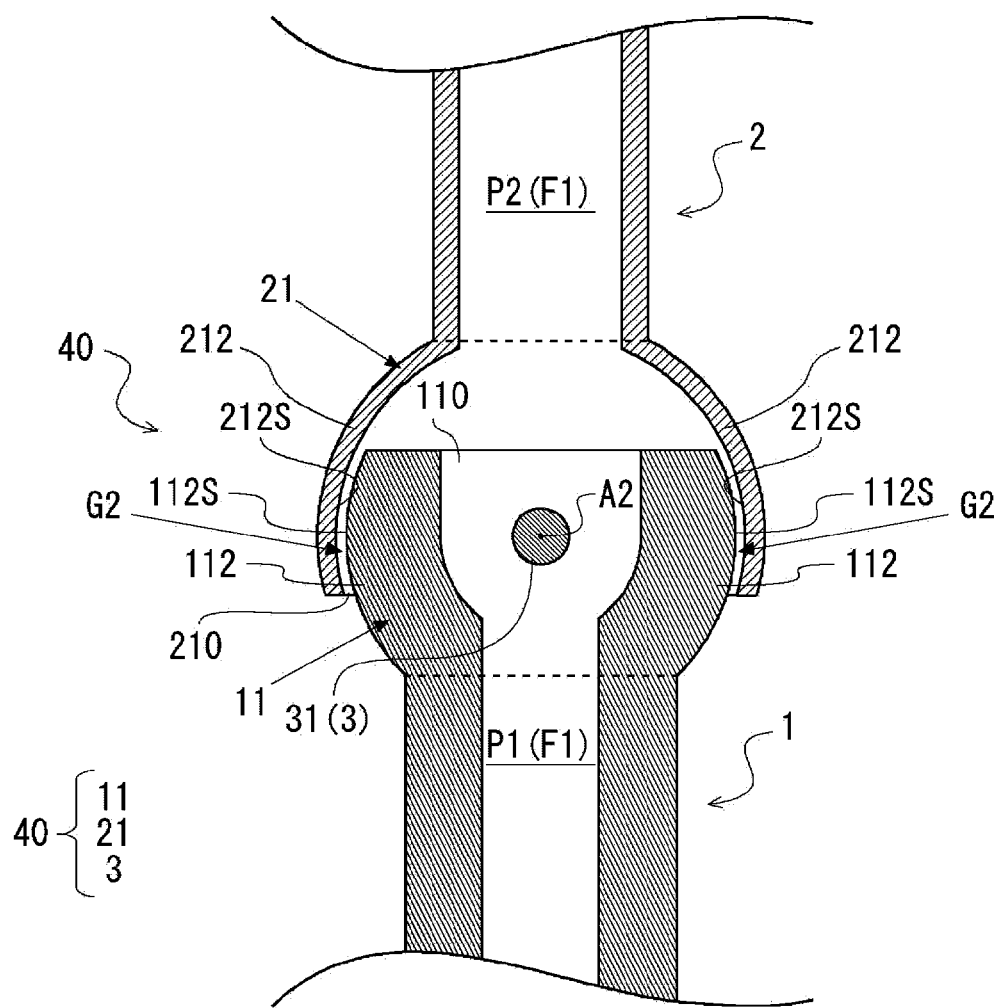
FIG. 11 is a diagram (2) illustrating the coupling structure according to the first embodiment in the first state.

FIG. 10 and FIG. 11 are diagrams illustrating the coupling structure 40 in the first state. FIG. 10 illustrates a cross-section along the first pivot axis A1 and the second pivot axis A2. FIG. 11 illustrates a cross-section orthogonal to the first pivot axis A1 and the second pivot axis A2. As illustrated in FIG. 10, in the first state in which no gas is flowing through the flow path F1, a gap G1 is formed between the first flat surface 111S of the first coupling portion 11 and the second flat surface 211S of the second coupling portion 21 facing the first flat surface 111S. As illustrated in FIG. 11, in the first state, a gap G2 is formed between the first arc surface 112S of the first coupling portion 11 and the second arc surface 212S of the second coupling portion 21 facing the first arc surface 112S. Thus, in the first state, the pivoting of the downstream tube 2 about the second pivot axis A2 with respect to the upstream tube 1 is not hindered. Here, the size of the gap G1 in the first state (that is, the distance between the first flat surface 111S and the second flat surface 211S) is denoted by d11, whereas the size of the gap G2 in the first state (that is, the distance between the first arc surface 112S and the second arc surface 212S) is denoted by d21. Under this condition, in the coupling structure 40, d11>0 and d21>0 hold.

Figure 12:
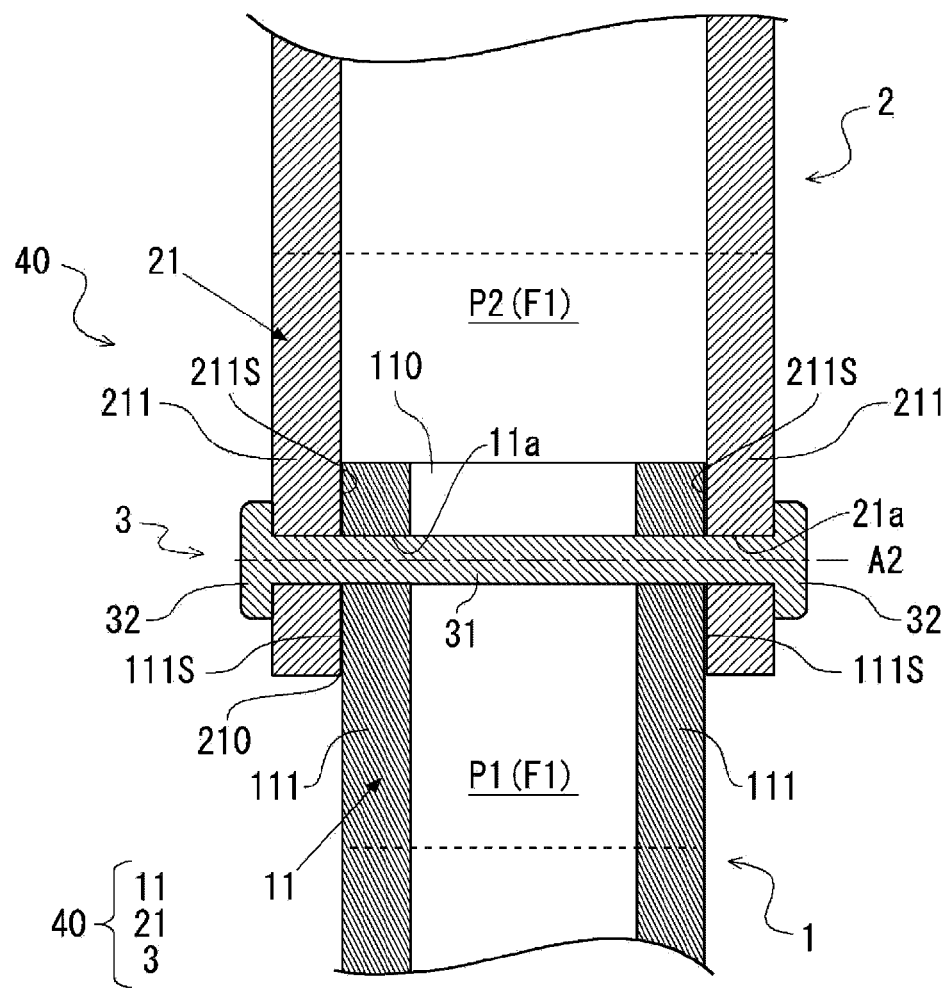
FIG. 12 is a diagram (1) illustrating the coupling structure according to the first embodiment in a second state.
Figure 13:
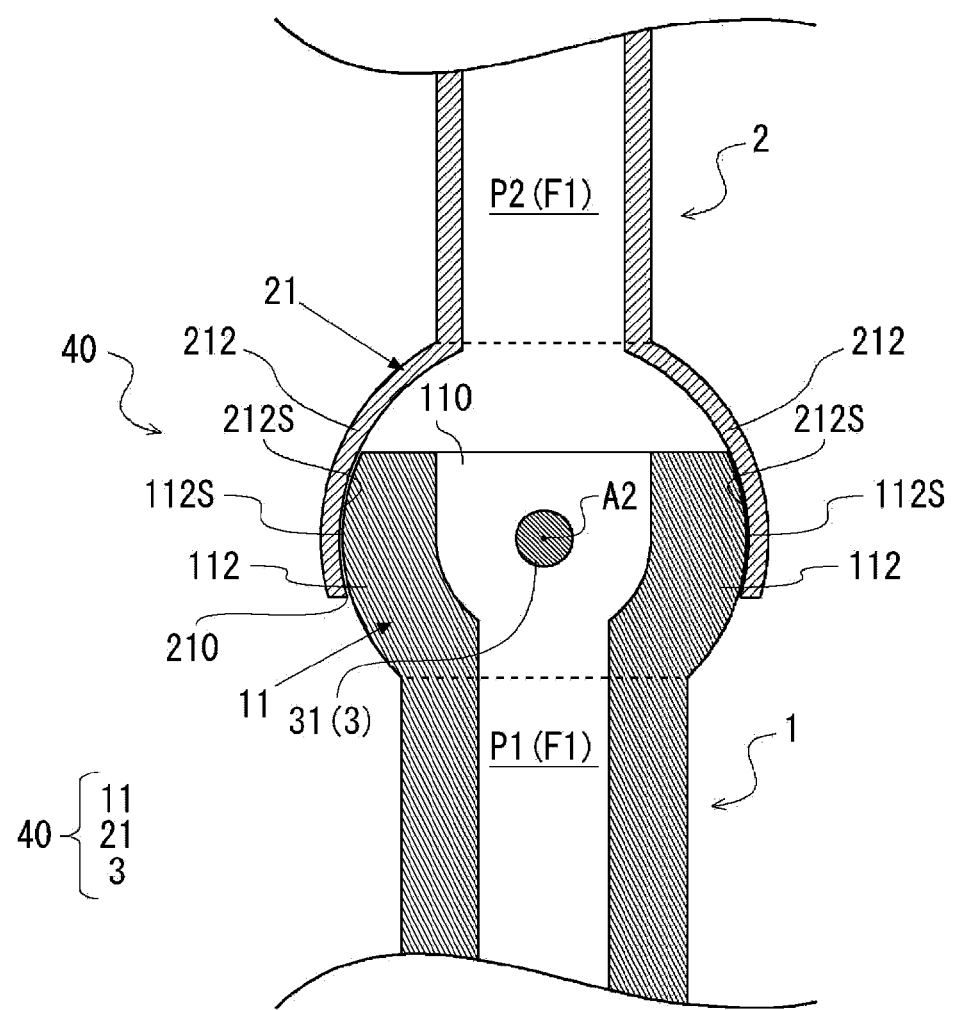
FIG. 13 is a diagram (2) illustrating the coupling structure according to the first embodiment in the second state.

FIG. 12 and FIG. 13 are diagrams illustrating the coupling structure 40 in the second state. FIG. 12 illustrates a cross-section along the first pivot axis A1 and the second pivot axis A2. FIG. 13 illustrates a cross-section orthogonal to the first pivot axis A1 and the second pivot axis A2. In the second state, the gas suddenly flowing through the flow path F1 causes pressure to act on the upstream tube 1 and the downstream tube 2 to inflate them. Specifically, when the gas flows through the flow path F1, pressure to expand the first coupling portion 11 toward the outer side of the flow path F1 acts on the first coupling portion 11, and pressure to expand the second coupling portion 21 toward the outer side of the flow path F1 acts on the second coupling portion 21.

In the coupling structure 40, rigidity of the first coupling portion 11 is set to be lower than rigidity of the second coupling portion 21, and thus the first coupling portion 11 is more likely to deform than the second coupling portion 21 in the second state in which the gas is flowing through the flow path F1. More specifically, in the coupling structure 40, the rigidity of the first coupling portion 11 is set to be lower than the rigidity of the second coupling portion 21, with the first coupling portion 11 formed by a material (a resin material in the present example) having an elastic modulus lower than the material (a metal material in the present example) forming the second coupling portion 21. The elastic modulus in the present specification is a ratio of stress to strain (stress/strain). The elastic modulus can be expressed by a ratio (stress/strain), using the magnitude of the stress acting on the coupling portion due to the pressure of the fluid, and the magnitude of the strain of the coupling portion due to the stress.

In the coupling structure 40, the rigidity of the first coupling portion 11 is set to be lower than the rigidity of the second coupling portion 21, meaning that the first coupling portion 11 is more likely to deform than the second coupling portion 21 when the same gas pressure acts on the first coupling portion 11 and the second coupling portion 21. As a result, as illustrated in FIG. 12 and FIG. 13, in the second state in which the gas is flowing through the flow path F1, the first coupling portion 11 is more likely to deform to inflate toward the outer side of the flow path F1 than the second coupling portion 21. Specifically, as illustrated in FIG. 12, the first flat wall 111 deflects toward the outer side of the flow path F1. As illustrated in FIG. 13, the first arc wall 112 deflects toward the outer side of the flow path F1. Thus, in the second state, the first flat surface 111S of the first coupling portion 11 approaches the second flat surface 211S of the second coupling portion 21, and the first arc surface 112S of the first coupling portion 11 approaches the second arc surface 212S of the second coupling portion 21. As a result, in the second state, the gap G1 and the gap G2 are smaller than in the first state.

Here, the size of the gap G1 in the second state is denoted by d12, and the size of the gap G2 in the second state is denoted by d22. Under this condition, in the coupling structure 40, d11>d12 and d21>d22 hold. Note that "reducing the gap" includes eliminating the gap. Thus, "reducing the gap" includes setting d12 or d22 to be 0. As illustrated in FIG. 12 and FIG. 13, in the present example, gas pressure acting on the first coupling portion 11 causes the first coupling portion 11 to deform to expand toward the outer side of the flow path F1, leading to the first flat surface 111S coming into contact with the second flat surface 211S and the first arc surface 112S coming into contact with the second arc surface 212S, resulting in elimination of the gap G1 and the gap G2, respectively. Thus, the sealing property is improved over that in the first state, and thus leakage of gas to the outside is favorably suppressed.

Furthermore, in the present embodiment, the clamping portions 32 come into contact with the second flat walls 211 of the second coupling portion 21 from the outer side, to clamp the second coupling portion 21 from both sides in the second pivot axis A2 direction, and thus the second flat walls 211 are prevented from deforming in the second state. In other words, the second flat walls 211 are prevented from deflecting toward the outer side of the flow path F1 in the second state. Thus, in the second state, approaching the first flat surface 111S of the first coupling portion 11 to the second flat surface 211S of the second coupling portion 21 is facilitated, and thus the reduction of the gap G1 is facilitated.

Reduction of the gap between the first coupling portion 11 and the second coupling portion 21 might render the pivoting of the downstream tube 2 with respect to the upstream tube 1 difficult. Still, usually, in the second state in which the inflator 10 is actuated and the gas is flowing through the flow path F1, the angle adjustment of the seat back S2 should not be required. Thus, in the second state, the reduction of the above-described gap should not be a problem. More specifically, in the second state, it is acceptable even if the downstream tube 2 is not pivotable with respect to the upstream tube 1 due to the gap between the first coupling portion 11 and the second coupling portion 21 being reduced. It suffices if the first coupling portion 11 and the second coupling portion 21 are coupled with the downstream tube 2 being pivotable with respect to the upstream tube 1 at an angle in the predetermined range, at least in the first state.

[Actions and Effects]

As described above, the coupling structure 40 according to the present embodiment includes the first coupling portion 11 formed by one end portion of the upstream tube 1 including the first outflow opening 110 of the upstream tube 1 and the second coupling portion 21 formed by one end portion of the downstream tube 2 including the inflow opening 210 of the downstream tube 2. The first coupling portion 11 is inserted in the second coupling portion 21 through the inflow opening 210 of the downstream tube 2 with the first outflow opening 110 of the upstream tube 1 positioned on the inner side of the second coupling portion 21. The first coupling portion 11 and the second coupling portion 21 are coupled with the downstream tube 2 being pivotable with respect to the upstream tube 1 at an angle in the predetermined range at least in the first state. The coupling structure 40 is configured such that the gap is formed between the outer surface of the upstream tube 1 and the inner surface of the downstream tube 2 to prevent the pivoting of the downstream tube 2 with respect to the upstream tube 1 from being hindered in the first state, and in the second state, the gas pressure acting on the first coupling portion 11 causes the first coupling portion 11 to deform to expand toward the outer side of the flow path F1 to reduce the above-described gap from that in the first state.

Specifically, in the coupling structure 40, the gap is formed between the outer surface of the first coupling portion 11 and the inner surface of the second coupling portion 21 to prevent the pivoting of the downstream tube 2 with respect to the upstream tube 1 from being hindered in the first state, and in the second state, the gas pressure causes the first coupling portion 11 to deform to reduce the above-described gap from that in the first state. As a result, the coupling structure 40 can achieve both smooth pivoting of the downstream tube 2 with respect to the upstream tube 1 in the first state and the gas sealing property in the second state.

Furthermore, in the present embodiment, a member for closing the gap is optionally not interposed between the outer surface of the first coupling portion 11 and the inner surface of the second coupling portion 21. With this configuration, the downstream tube 2 can more smoothly pivot with respect to the upstream tube 1 in the first state. The gap G1 and the gap G2 may be filled with grease or the like, by coating the outer surface of the first coupling portion 11 and the inner surface of the second coupling portion 21 with the grease or the like, to guarantee the sealing property even if the gap remains in the second state. The coating with grease may be applied to a second embodiment described below and to a variation thereof.

Furthermore, in the present embodiment, the rigidity of the first coupling portion 11 is set to be lower than the rigidity of the second coupling portion 21, with the first coupling portion 11 being more likely to deform than the second coupling portion 21 in the second state. With this configuration, when the same gas pressure acts on the first coupling portion 11 and the second coupling portion 21 in the second state, the first coupling portion 11 can be more likely to deform to expand toward the outer side of the flow path F1 than the second coupling portion 21. Thus, the reduction of the gap between the outer surface of the first coupling portion 11 and the inner surface of the second coupling portion 21 can be facilitated in the second state.

In the present embodiment, the elastic modulus of the material forming the first coupling portion 11 is lower than the elastic modulus of the material forming the second coupling portion 21. With this configuration, the first coupling portion 11 can have lower rigidity than the second coupling portion 21.

In the present embodiment, the outer surfaces of the first coupling portion 11 are formed to include the pair of first flat surfaces 111S, 111S and the pair of first arc surfaces 112S, 112S, and the inner surfaces of the second coupling portion 21 are formed to include the pair of second flat surfaces 211S, 211S facing the pair of first flat surfaces 111S, 111S and the pair of second arc surfaces 212S, 212S facing the pair of first arc surfaces 112S, 112S. With this configuration, the first coupling portion 11 and the second coupling portion 21 have similar surfaces (the first flat surface 111S and the second flat surface 211S, the first arc surface 112S and the second arc surface 212S) facing each other. Thus, the gap G1 can have the same size, regardless of the angle of the downstream tube 2 with respect to the upstream tube 1 (that is, regardless of the orientation of the downstream tube 2) in the first state. Similarly, the gap G2 can have the same size regardless of the angle of the downstream tube 2 with respect to the upstream tube 1 in the second state. As a result, the downstream tube 2 can more smoothly pivot with respect to the upstream tube 1 in the first state, and stable sealing property can be guaranteed regardless of the angle of the downstream tube 2 with respect to the upstream tube 1 in the second state.

Note that, in the present embodiment, the first arc wall 112 of the first coupling portion 11 deflects toward the outer side of the flow path F1 in the second state to reduce the gap G2, but the first arc wall 112 may not deform. In the second state, only the first flat wall 111 may deform. In such a case, for example, the gap G2 between the first arc surface 112S of the first coupling portion 11 and the second arc surface 212S of the first coupling portion 21 may be filled with a liquid lubricant such as grease. With this configuration, smooth pivoting of the downstream tube 2 with respect to the upstream tube 1 can be guaranteed in the first state, and the gas sealing property can be guaranteed in the second state.

Furthermore, in the present embodiment, the clamping portions 32 are provided as a restriction portion that restricts deformation of the second coupling portion 21 in the second state with the clamping portions 32 coming into contact with the second coupling portion 21 from the outer side. With this configuration, deformation of the second coupling portion 21 to expand toward the outer side of the flow path F1 can be restricted in the second state. As a result, in the second state, approaching of the outer surface of the first coupling portion 11 to the inner surface of the second coupling portion 21 is facilitated, and thus the reduction of the gap between the first coupling portion 11 and the second coupling portion 21 can be facilitated.

In the present embodiment, the clamping portions 32 of the coupling shaft 3 for coupling the first coupling portion 11 and the second coupling portion 21 are defined as the "restriction portion" according to the present disclosure, but the "restriction portion" of the present disclosure is not limited to this. For example, a member that surrounds the entire second coupling portion from the outer side may be provided as the restriction portion.

Furthermore, in the present embodiment, the first coupling portion 11 and the second coupling portion 21 are configured to be coupled with the first coupling portion 11 inserted in the second coupling portion 21. The first coupling portion 11 is formed by one end portion of the upstream tube 1 including the first outflow opening 110. Furthermore, the second coupling portion 21, in which the first coupling portion 11 is inserted, is formed by one end portion of the downstream tube 2, disposed on the downstream side of the upstream tube 1, including the inflow opening 210. With this configuration, gas flows from the upstream tube 1 to the downstream tube 2 in the flow path F1. Thus, the pressure of the gas acts on the first coupling portion 11 formed in the upstream tube 1 before on the second coupling portion 21 formed in the downstream tube 2. Thus, even when the gas pressure causes the second coupling portion 21 to deform, the first coupling portion 11 can deform to expand toward the outer side of the flow path F1 before the deformation of the second coupling portion 21. As a result, in the second state, the gap between the first coupling portion 11 and the second coupling portion 21 is swiftly reduced, and thus the gas sealing property can be swiftly increased.

In the present disclosure, the downstream tube may be defined as the "first tube" according to the present disclosure, the first coupling portion may be formed by one end portion of the downstream tube including the opening, the upstream tube may be defined as the "second tube" according to the present disclosure, and the second coupling portion may be formed by one end portion of the upstream tube including the opening. Thus, in the present embodiment, the second coupling portion 21 may be formed by a portion of the upstream tube 1 including the first outflow opening 110, the first coupling portion 11 may be formed by a portion of the downstream tube 2 including the inflow opening 210, and the first coupling portion 11 and the second coupling portion 21 may be coupled with the first coupling portion 11 inserted in the second coupling portion 21.

Furthermore, in the present embodiment, the vehicle seat S10 is provided with the coupling structure 40, with the second pivot axis A2 for the downstream tube 2 to pivot with respect to the upstream tube 1 and the seat back pivot axis A10 for the seat back S2 to recline coinciding with each other. With this configuration, the pivot axis of the seat back S2 and the pivot axis of the downstream tube 2 are coaxial, and thus the downstream tube 2 can favorably follow the reclining operation of the seat back S2.

Furthermore, in the present embodiment, the upstream tube 1 can pivot with respect to the inflator 10, and thus the degree of freedom in the layout of the airbag device 100 in the vehicle seat S10 can be improved. For example, when a height position of a front end portion of the seat cushion S1 is adjustable, the height of the second airbag 30 changes with the height of the above-described front end portion. In such a case, with the upstream tube 1 connected to the second airbag 30 via the second conduit 5 being pivotable with respect to the inflator 10, the upstream tube 1 can follow a change in the height of the second airbag 30.

In the present embodiment, a case where the inflator 10 is disposed in the seat cushion S1 in the vehicle seat S10 is described. However, the part where the inflator is disposed is not limited to the seat cushion. For example, the vehicle seat may be configured to supply gas to an airbag for preventing seatbelt submarining, disposed in the seat cushion, from the inflator disposed the seat back.

Second Embodiment

Figure 14:
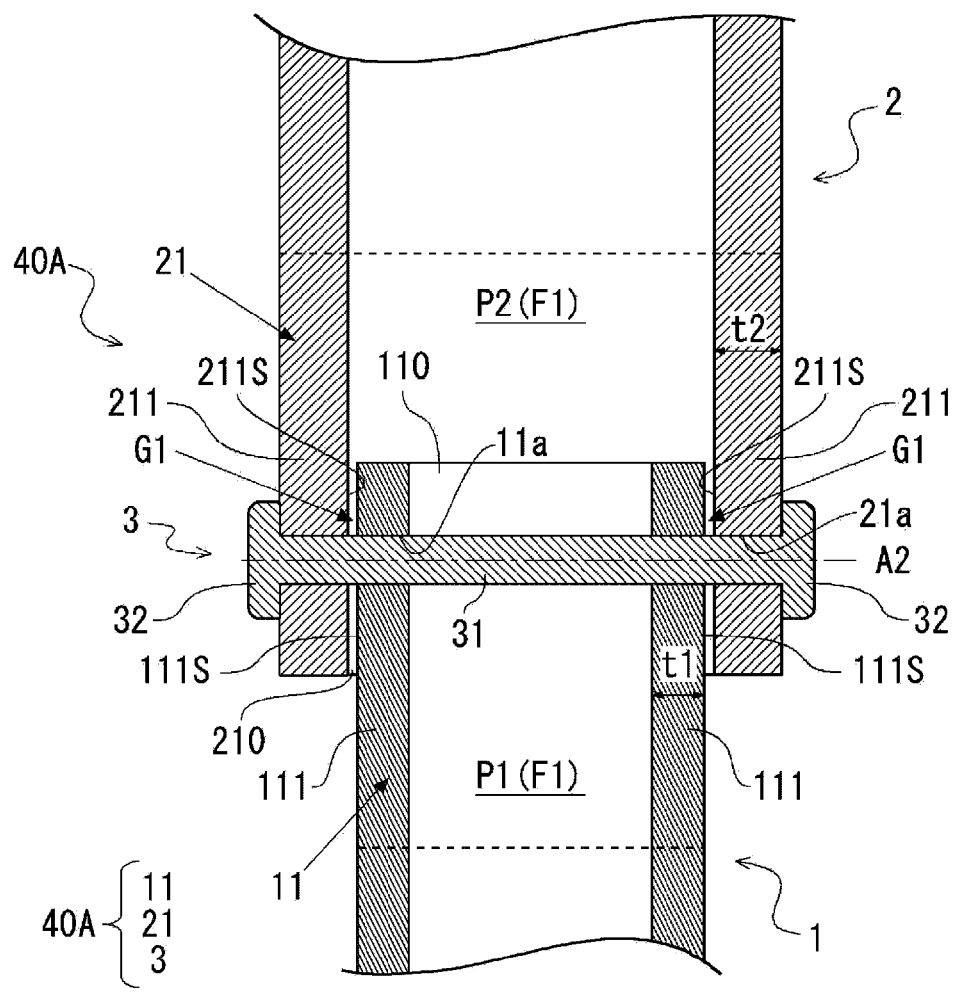
FIG. 14 is a diagram illustrating a coupling structure according to a second embodiment in the first state.
Figure 15:
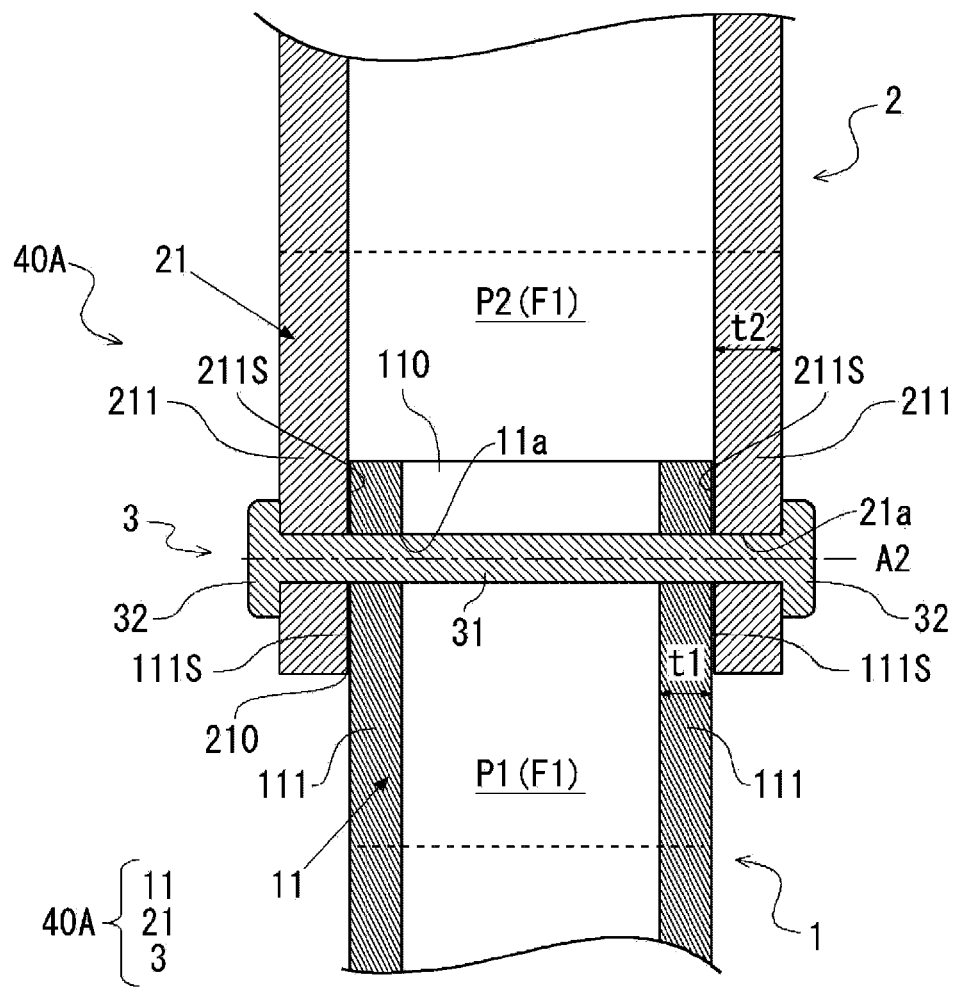
FIG. 15 is a diagram illustrating the coupling structure according to the second embodiment in the second state.

A coupling structure according to a second embodiment will be described below. FIG. 14 is a diagram illustrating the coupling structure 40A according to the second embodiment in the first state. FIG. 15 is a diagram illustrating the coupling structure 40A according to the second embodiment in the second state. FIG. 14 and FIG. 15 illustrate a cross-section along the first pivot axis A1 and the second pivot axis A2. In the description of the second embodiment below, differences from the coupling structure 40 according to the first embodiment described with reference to FIG. 1 to FIG. 13 will be mainly described, and detailed descriptions on points similar to those in the coupling structure 40 will be omitted.

In the second embodiment, the upstream tube 1 and the downstream tube 2 are formed of the same material (a metal material in the present example). In other words, the material forming the first coupling portion 11 and the material forming the second coupling portion 21 are the same. Here, the thickness of the first flat wall 111 of the first coupling portion 11 is denoted by t1, and the thickness of the second flat wall 211 of the second coupling portion 21 is denoted by t2. In the coupling structure 40A, t1<t2 holds. In other words, in the coupling structure 40A, the first flat wall 111 is formed to be thinner than the second flat wall 211. As a result, in the coupling structure 40A, the rigidity of the first coupling portion 11 is set to be lower than the rigidity of the second coupling portion 21, with the first coupling portion 11 being more likely to deform than the second coupling portion 21 in the second state.

Also in the coupling structure 40A, the rigidity of the first coupling portion 11 is set to be lower than the rigidity of the second coupling portion 21, meaning that the first coupling portion 11 is more likely to deform than the second coupling portion 21 when the same gas pressure acts on the first coupling portion 11 and the second coupling portion 21. As a result, as illustrated in FIG. 15, in the second state in which the gas is flowing through the flow path F1, the first coupling portion 11 is more likely to deform to expand toward the outer side of the flow path F1 than the second coupling portion 21. Specifically, as illustrated in FIG. 15, the first flat wall 111 deflects toward the outer side of the flow path F1. Thus, in the second state, the first flat surface 111S of the first coupling portion 11 approaches the second flat surface 211S of the second coupling portion 21. As a result, in the second state, the gap G1 is smaller than in the first state.

With the coupling structure 40A according to the second embodiment described above, the advantageous effects similar to that obtained with the coupling structure 40 according to the first embodiment can be obtained. Specifically, in the coupling structure 40A, the gap is formed between the outer surface of the first coupling portion 11 and the inner surface of the second coupling portion 21 to prevent the pivoting of the downstream tube 2 with respect to the upstream tube 1 from being hindered in the first state, and in the second state, the gas pressure causes the first coupling portion 11 to deform to reduce the above-described gap from that in the first state. As a result, the coupling structure 40A can achieve both smooth pivoting of the downstream tube 2 with respect to the upstream tube 1 in the first state and the gas sealing property in the second state.

[Variation of Second Embodiment]

Figure 16:
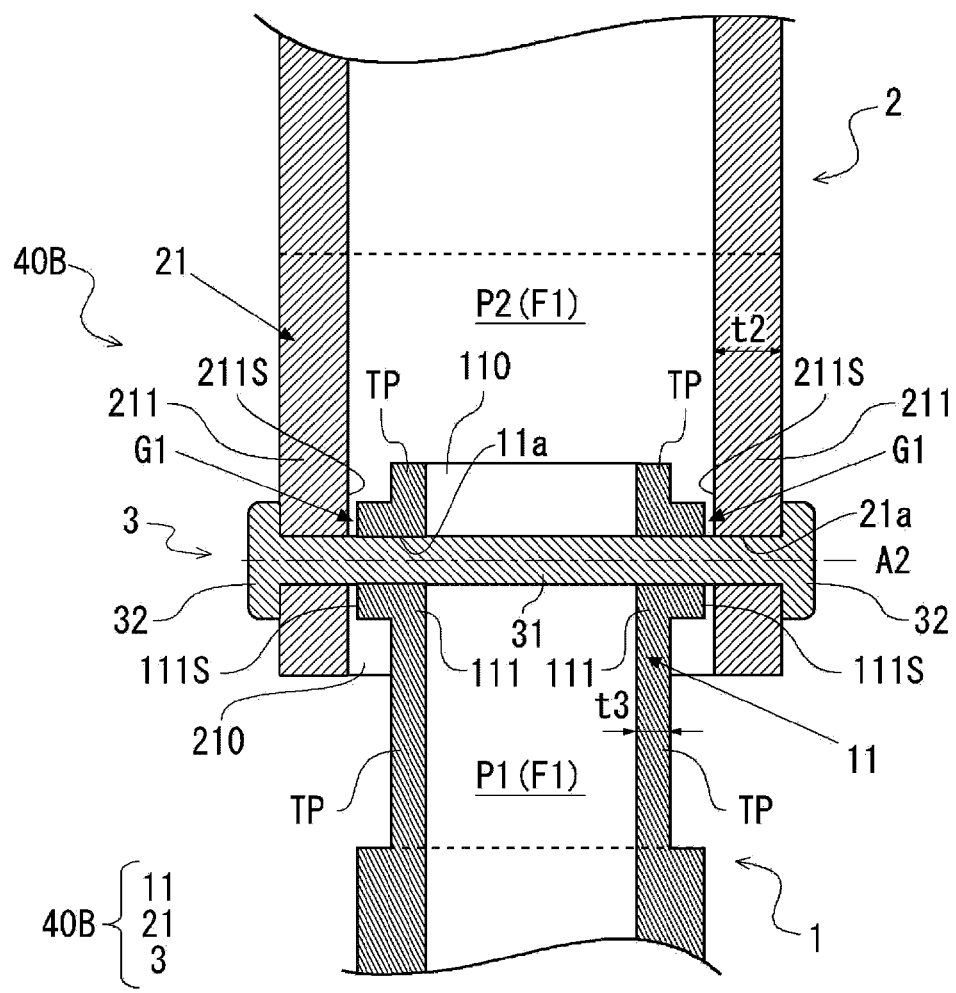
FIG. 16 is a diagram illustrating a coupling structure according to a variation of the second embodiment in the first state.

FIG. 16 is a diagram illustrating a coupling structure 40B according to a variation of the second embodiment in the first state. As illustrated in FIG. 16, in the coupling structure 40B, a part of the first flat wall 111 of the first coupling portion 11 (a portion excluding the periphery of the through-hole 21a, through which the shaft main body portion 31 of the coupling shaft 3 passes) is formed as a thinned part TP that is thinner than the other portions of the first flat wall 111. The thickness of the thinned part TP of the first flat wall 111 is denoted by t3. In the coupling structure 40B, t3<t2 holds. In other words, in the coupling structure 40B, the first flat wall 111 is formed to be thinner than the second flat walls 211. As a result, in the coupling structure 40B, the rigidity of the first coupling portion 11 can be set to be lower than the rigidity of the second coupling portion 21, with the first coupling portion 11 being more likely to deform than the second coupling portion 21 in the second state. As a result, in the second state, the gap G1 can be smaller than in the first state. In the coupling structure 40B, the thinned part TP of the first coupling portion 11 is a portion other than the portion coupled to the second coupling portion 21 (the portion in the periphery of the through-hole 11a). Thus, sufficient strength of the portion of the first coupling portion 11 coupled to the second coupling portion 21 can be guaranteed. As a result, resistance to the load generated by the coupling shaft 3 due to the reclining operation in the first state can be maintained.

<Others>

Suitable embodiments according to the present disclosure have been described above, but each aspect disclosed in the present specification can be combined with any other features disclosed in the present specification. For example, the elastic modulus of the material forming the first coupling portion may be set to be lower than the elastic modulus of the material forming the second coupling portion, and at least a part of the first coupling portion may be formed to be thinner than the second coupling portion. While an example where the technique according to the present disclosure is applied to an airbag device in which airbags are inflated and expanded using gas supplied from an inflator is described above, the target of application of the technique of the present disclosure is not limited to the airbag device. The technique of the present disclosure can be applied to a coupling structure for coupling an upstream tube and a downstream tube for guiding a fluid from a fluid supply source to a fluid supply target, and the fluid supply source, the fluid supply target, and the fluid are not limited to inflator, airbag, and gas. For example, the fluid supplied from the fluid supply source to the fluid supply target may be a liquid.

REFERENCE SIGNS LIST

1 Upstream tube
11 First coupling portion
111S First flat surface
112S First arc surface
110 First outflow opening (opening of upstream tube)
2 Downstream tube
21 Second coupling portion
211S Second flat surface
212S Second arc surface
210 Inflow opening (opening of downstream tube)
3 Coupling shaft
31 Shaft main body portion
32 Clamping portion
10 Inflator (fluid supply source)
20 First airbag (fluid supply target)
40 Coupling structure
100 Airbag device
S1 Seat cushion (seating surface portion)
S2 Seat back (backrest portion)
S10 Vehicle seat
A2 Second pivot axis (pivot axis of second tube)
A10 Seat back pivot axis (pivot axis of backrest portion)

The invention claimed is:

1. A coupling structure that couples an upstream tube and a downstream tube disposed on a downstream side of the upstream tube, forming at least a part of a flow path for guiding a fluid from a fluid supply source to a fluid supply target, the coupling structure comprising:
a first coupling portion formed by one end portion of a first tube that is one of the upstream tube and the downstream tube, the end portion including an opening of the first tube; and
a second coupling portion formed by one end portion of a second tube that is another of the upstream tube and the downstream tube, the end portion including an opening of the second tube, wherein
the first coupling portion is inserted in the second coupling portion through the opening of the second tube, with the opening of the first tube positioned on an inner side of the second coupling portion,
the first coupling portion and the second coupling portion are coupled, with the second tube being pivotable with respect to the first tube at an angle in a predetermined range at least in a first state in which the fluid is not flowing through the flow path, and
a gap is formed between an outer surface of the first coupling portion and an inner surface of the second coupling portion to prevent pivoting of the second tube with respect to the first tube from being hindered in the first state, and in a second state in which the fluid is flowing through the flow path, pressure of the fluid acting on the first coupling portion causes the first coupling portion to deform to expand toward an outer side of the flow path to reduce the gap as compared to the gap in the first state.

2. The coupling structure according to claim 1, wherein a member for closing the gap is not interposed between the outer surface of the first coupling portion and the inner surface of the second coupling portion.

3. The coupling structure according to claim 1, wherein
the first coupling portion is formed by one end portion of the upstream tube including the opening, and
the second coupling portion is formed by one end portion of the downstream tube including the opening.

4. The coupling structure according to claim 1, wherein rigidity of the first coupling portion is set to be lower than rigidity of the second coupling portion, with the first coupling portion being more likely to deform than the second coupling portion in the second state.

5. The coupling structure according to claim 4, wherein an elastic modulus of a material forming the first coupling portion is lower than an elastic modulus of a material forming the second coupling portion.

6. The coupling structure according to claim 4, wherein at least a part of the first coupling portion is formed to be thinner than the second coupling portion.

7. The coupling structure according to claim 1, wherein a restriction portion is provided that restricts deformation of the second coupling portion in the second state with the restriction portion coming into contact with the second coupling portion from an outer side.

8. The coupling structure according to claim 7, further comprising a coupling shaft that forms a pivot axis extending in a direction orthogonal to an extending direction of the first tube and couples the first coupling portion and the second coupling portion, with the second tube being pivotable around the pivot axis with respect to the first tube at an angle in a predetermined range at least in the first state, wherein
the coupling shaft includes a rod-shaped shaft main body portion that passes through the first coupling portion and the second coupling portion and forms the pivot axis, and clamping portions that are provided at both ends of the shaft main body portion and are in contact with an outer surface of the second coupling portion to clamp the second coupling portion, and
the clamping portions are formed as the restriction portion.

9. The coupling structure according to claim 1, wherein
the first coupling portion and the second coupling portion are coupled, with the second tube being pivotable around a pivot axis extending in a direction orthogonal to an extending direction of the first tube, with respect to the first tube at an angle in a predetermined range at least in the first state,
the outer surface of the first coupling portion includes a pair of first flat surfaces orthogonal to the pivot axis direction and a pair of first arc surfaces curved to form an arc-shaped surface about the pivot axis, while connecting edges of one side ends and edges of the other side ends of the pair of first flat surfaces, and
the inner surface of the second coupling portion includes a pair of second flat surfaces orthogonal to the pivot axis direction and facing the pair of first flat surfaces, and a pair of second arc surfaces curved to form an arc-shaped surface about the pivot axis, while connecting edges of one side ends and edges of the other side ends of the pair of second flat surfaces and facing the pair of first arc surfaces.

10. An airbag device, comprising:
an inflator that is a supply source of gas;
an airbag that is a supply target of the gas and is expanded with supply of the gas;

an upstream tube and a downstream tube disposed on a downstream side of the upstream tube, forming at least a part of a flow path for guiding the gas from the inflator to the airbag; and a coupling structure that couples the upstream tube and the downstream tube, the coupling structure including:

a first coupling portion formed by one end portion of a first tube that is one of the upstream tube and the downstream tube, the end portion including an opening of the first tube; and a second coupling portion formed by one end portion of a second tube that is another of the upstream tube and the downstream tube, the end portion including an opening of the second tube, wherein the first coupling portion is inserted in the second coupling portion through the opening of the second tube, with the opening of the first tube positioned on an inner side of the second coupling portion, the first coupling portion and the second coupling portion are coupled, with the second tube being pivotable with respect to the first tube at an angle in a predetermined range at least in a first state in which the gas is not flowing through the flow path, and a gap is formed between an outer surface of the first coupling portion and an inner surface of the second coupling portion to prevent pivoting of the second tube with respect to the first tube from being hindered in the first state, and in a second state in which the gas is flowing through the flow path, pressure of the gas acting on the first coupling portion causes the first coupling portion to deform to expand toward an outer side of the flow path to reduce the gap as compared to the gap in the first state.

11. A vehicle seat comprising the airbag device described in claim 10.

12. The vehicle seat according to claim 11, comprising:

a seating surface portion that supports buttocks of an occupant; and a backrest portion that supports a back of the occupant and is provided to be reclinable with respect to the seating surface portion, wherein the inflator is disposed in the seating surface portion, the airbag is disposed in the backrest portion, and the coupling structure is provided, with a pivot axis for the second tube to pivot with respect to the first tube and a pivot axis for the backrest portion to recline coinciding with each other.

13. The coupling structure according to claim 3, wherein rigidity of the first coupling portion is set to be lower than rigidity of the second coupling portion, with the first coupling portion being more likely to deform than the second coupling portion in the second state.

14. The coupling structure according to claim 13, wherein an elastic modulus of a material forming the first coupling portion is lower than an elastic modulus of a material forming the second coupling portion.

15. The coupling structure according to claim 13, wherein at least a part of the first coupling portion is formed to be thinner than the second coupling portion.

16. The coupling structure according to claim 3, wherein a restriction portion is provided that restricts deformation of the second coupling portion in the second state with the restriction portion coming into contact with the second coupling portion from an outer side.

17. The coupling structure according to claim 16, further comprising a coupling shaft that forms a pivot axis extending in a direction orthogonal to an extending direction of the first tube and couples the first coupling portion and the second coupling portion, with the second tube being pivotable around the pivot axis with respect to the first tube at an angle in a predetermined range at least in the first state, wherein the coupling shaft includes a rod-shaped shaft main body portion that passes through the first coupling portion and the second coupling portion and forms the pivot axis, and clamping portions that are provided at both ends of the shaft main body portion and are in contact with an outer surface of the second coupling portion to clamp the second coupling portion, and the clamping portions are formed as the restriction portion.

18. The coupling structure according to claim 3, wherein the first coupling portion and the second coupling portion are coupled, with the second tube being pivotable around a pivot axis extending in a direction orthogonal to an extending direction of the first tube, with respect to the first tube at an angle in a predetermined range at least in the first state, the outer surface of the first coupling portion includes a pair of first flat surfaces orthogonal to the pivot axis direction and a pair of first arc surfaces curved to form an arc-shaped surface about the pivot axis, while connecting edges of one side ends and edges of the other side ends of the pair of first flat surfaces, and the inner surface of the second coupling portion includes a pair of second flat surfaces orthogonal to the pivot axis direction and facing the pair of first flat surfaces, and a pair of second arc surfaces curved to form an arc-shaped surface about the pivot axis, while connecting edges of one side ends and edges of the other side ends of the pair of second flat surfaces and facing the pair of first arc surfaces.

* * * * *